United States Patent
Van der Auwera et al.

(10) Patent No.: US 9,438,853 B2
(45) Date of Patent: Sep. 6, 2016

(54) RECEIVER DRIVEN UP-SWITCHING IN VIDEO TELEPHONY

(71) Applicant: QUALCOMM Incorporated, San Diego, CA (US)

(72) Inventors: Geert Van der Auwera, San Diego, CA (US); Muhammed Zeyd Coban, Carlsbad, CA (US); Marta Karczewicz, San Diego, CA (US); Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/811,569

(22) Filed: Jul. 28, 2015

(65) Prior Publication Data

US 2016/0037125 A1 Feb. 4, 2016

Related U.S. Application Data

(60) Provisional application No. 62/030,513, filed on Jul. 29, 2014.

(51) Int. Cl.
*H04N 7/14* (2006.01)
*H04N 19/40* (2014.01)
(Continued)

(52) U.S. Cl.
CPC .......... *H04N 7/147* (2013.01); *H04L 43/0852* (2013.01); *H04L 47/12* (2013.01); *H04L 47/2416* (2013.01); *H04L 47/263* (2013.01); *H04L 47/283* (2013.01); *H04N 7/148* (2013.01);
(Continued)

(58) Field of Classification Search
CPC ...................................................... H04N 7/147
USPC ........... 348/14.12, 839, 14.13; 370/231, 236, 370/252, 328, 329, 335, 432, 517, 216, 230, 370/230.1, 235; 380/28, 263; 382/232; 455/452.2; 600/300; 709/219, 224, 231
See application file for complete search history.

(56) References Cited

U.S. PATENT DOCUMENTS 5,063,562 A * 11/1991 Barzilai .................. H04L 47/10 370/231
5,760,848 A * 6/1998 Cho .......................... H04N 5/44 348/839

(Continued)

OTHER PUBLICATIONS

3rdGeneration Partnership Project; Technical Specification Group Services and System Aspects; IP Multimedia Subsystem (IMS); Multimedia Telephony; Media handling and interaction (Release 12), 3GPP Draft; 26114-C60, 3rd Generation Partnership Project (3GPP),XP050839018, Jun. 2014, 311 pp.

(Continued)

Primary Examiner — Gerald Gauthier
(74) Attorney, Agent, or Firm — Shumaker & Sieffert, P.A.

(57) ABSTRACT

In an example, a method of processing data includes determining, by a receiver device, an allowable excess delay parameter based on a difference between a time at which received data is received by the receiver device and a time at which the received data is scheduled to be played out, where the allowable excess delay parameter indicates an amount of delay that is supportable by a channel between a sender device and the receiver device. The method also includes determining, by the receiver device, a sender bit rate increase for increasing a bit rate at which data is to be sent from the sender device to the receiver device based on the determined allowable excess delay parameter, and transmitting an indication of the sender bit rate increase to the sender device.

27 Claims, 9 Drawing Sheets

(51) Int. Cl.
*H04N 19/61* (2014.01)
*H04N 7/15* (2006.01)
*H04N 21/2365* (2011.01)
*H04N 21/2662* (2011.01)
*H04N 21/434* (2011.01)
*H04L 12/26* (2006.01)
*H04L 12/853* (2013.01)
*H04L 12/825* (2013.01)
*H04L 12/841* (2013.01)
*H04L 12/801* (2013.01)

(52) U.S. Cl.
CPC .............. *H04N 7/15* (2013.01); *H04N 7/152* (2013.01); *H04N 19/40* (2014.11); *H04N 19/61* (2014.11); *H04N 21/2365* (2013.01); *H04N 21/23655* (2013.01); *H04N 21/2662* (2013.01); *H04N 21/4347* (2013.01)

(56) References Cited

U.S. PATENT DOCUMENTS

| | | | | |
|---|---|---|---|---|
| 6,335,922 | B1* | 1/2002 | Tiedemann, Jr. | H04B 7/2659 370/335 |
| 6,450,954 | B1* | 9/2002 | Selker | G06F 19/322 128/920 |
| 7,379,546 | B2* | 5/2008 | Ibrahim | G06F 7/725 380/259 |
| 7,701,851 | B2* | 4/2010 | Chakareski | H04L 47/10 370/231 |
| 8,111,720 | B2* | 2/2012 | Synnergren | H04L 12/66 370/412 |
| 8,199,665 | B2* | 6/2012 | Won | H04L 41/5019 370/237 |
| 8,238,556 | B2* | 8/2012 | Yuan | H04L 9/0858 356/491 |
| 8,325,754 | B2* | 12/2012 | Lee | H04W 8/00 370/390 |
| 8,416,694 | B2* | 4/2013 | Meyer | H04L 47/10 370/230.1 |
| 8,472,379 | B2* | 6/2013 | Ishii | H04L 1/1874 370/328 |
| 8,977,063 | B2* | 3/2015 | Lee | H04N 7/147 348/14.08 |
| 9,119,111 | B2* | 8/2015 | Payette | H04W 28/22 |
| 9,173,230 | B2* | 10/2015 | Yang | H04W 72/1242 |
| 9,197,565 | B2* | 11/2015 | Khanchi | H04L 47/127 |
| 2008/0225721 | A1* | 9/2008 | Plamondon | H04L 47/10 370/235 |
| 2008/0225735 | A1* | 9/2008 | Qiu | H04L 1/0009 370/252 |
| 2009/0157865 | A1 | 6/2009 | Winter | |
| 2009/0305715 | A1* | 12/2009 | Barve | H04W 72/1284 455/452.2 |
| 2013/0114408 | A1* | 5/2013 | Sastry | H04W 28/02 370/231 |
| 2013/0332621 | A1* | 12/2013 | Keller | H04L 65/60 709/231 |
| 2014/0071819 | A1* | 3/2014 | Gopalan | H04W 28/14 370/230 |
| 2014/0140209 | A1* | 5/2014 | Shihada | H04L 43/0864 370/230 |
| 2014/0301195 | A1* | 10/2014 | Briscoe | H04L 47/11 370/230.1 |
| 2014/0376376 | A1* | 12/2014 | Bejerano | H04L 47/263 370/235 |
| 2015/0049682 | A1* | 2/2015 | Seo | H04L 5/0055 370/329 |
| 2015/0067137 | A1* | 3/2015 | VerSteeg | H04L 47/225 709/224 |
| 2015/0271225 | A1* | 9/2015 | Mao | H04L 47/27 709/219 |
| 2016/0037128 | A1* | 2/2016 | Van der Auwera | H04N 7/147 348/14.13 |
| 2016/0056927 | A1* | 2/2016 | Liu | H04W 28/04 370/216 |
| 2016/0057065 | A1* | 2/2016 | Briscoe | H04L 47/624 370/235 |

OTHER PUBLICATIONS

Ericsson, "Discussion on upswitch principles", 3GPP Draft; S4-AHM215, SA4 MTSI SWG conference call #4 on end-to-end video rate adaption of E2EMTSI-S4, 3rd Generation Partnership Project (3GPP), Jun. 2014, XP050838929, 2 pp.

Ericsson, "Requirements for end-to-end Video Rate Adaptation", 3GPP Draft; S4-140846 Draft CR on Video Adaptation Performance, 3rd Generation Partnership Project (3GPP), Mobile Competence Centre ; 650, Route Des Lucioles ; Jul. 30, 2014, XP050839757, 12 pp.

Ericsson: "Requirements for end-to-end Video Rate Adaptation," 3GPP Draft; S4-140686 CR26.114-0283 Rev 1 Requirements for End-To-End Video Rate Adaptation (Rel-12), 3rd Generation Partnership Project (3GPP), May 15, 2014, XP050839539, 11 pp.

International Search Report and Written Opinion—PCT/US2015/042664—ISA/EPO—Oct. 9, 2015 (13 pp.).

Qualcomm, "Video Adaptation Upswitch Performance", 3GPP Draft; TSG SA4 #80 meeting, Tdoc S4-140845, 3rd Generation Partnership Project (3GPP), Mobile Competence Centre ; 650, Route Des Lucioles; Jul. 30, 2014, XP050839756, 3 pp.

U.S. Appl. No. 14/811,491, filed by Van der Auwera, et al., on Jul. 28, 2015.

International Search Report and Written Opinion from International Application No. PCT/US2015/042654, dated Oct. 9, 2015, 12 pp.

Schulzrinne, et al., "RTP: A Transport Protocol for Real-Time Applications," Network Working Group, RFC 3550, Jul. 2003, 89 pp.

Wenger, et al., "Codec Control Messages in the RTP Audio-Visual Profile with Feedback (AVPF)," Network Working Group, RFC 5104, Feb. 2008, 64 pp.

Ericsson, "Discussion on upswitch principles", 3GPP Draft; S4-AHM215, SA4 MTSI SWG conference call #4 on end-to-end video rate adaption of E2EMTSI-S4, 3rd Generation Partnership Project (3GPP), Mobile Competence Centre ; 650, Route Des Lucioles ; F-06921 Sophia-Antipolis Cedex ; France, vol. SAWG4, Jun. 2014, XP050838929, 2 pp.

Report from SA4 MTSI SWG conf. call #4 on end-to-end video rate adaptation of E2EMTSI-S4 (Jun. 24, 2014), SA4 MTSI SWG Chairman, Aug. 4-8, 2014, 5 pp.

Office Action from U.S. Appl. No. 14/811,491 dated Feb. 22, 2016 (10 pages).

Reply to Written Opinion from PCT Application Serial No. PCT/US2015/042664 filed on May 25, 2015 (6 pages).

Reply to Written Opinion from PCT Application Serial No. PCT/US2015/042654 filed on May 25, 2015 (7 pages).

* cited by examiner

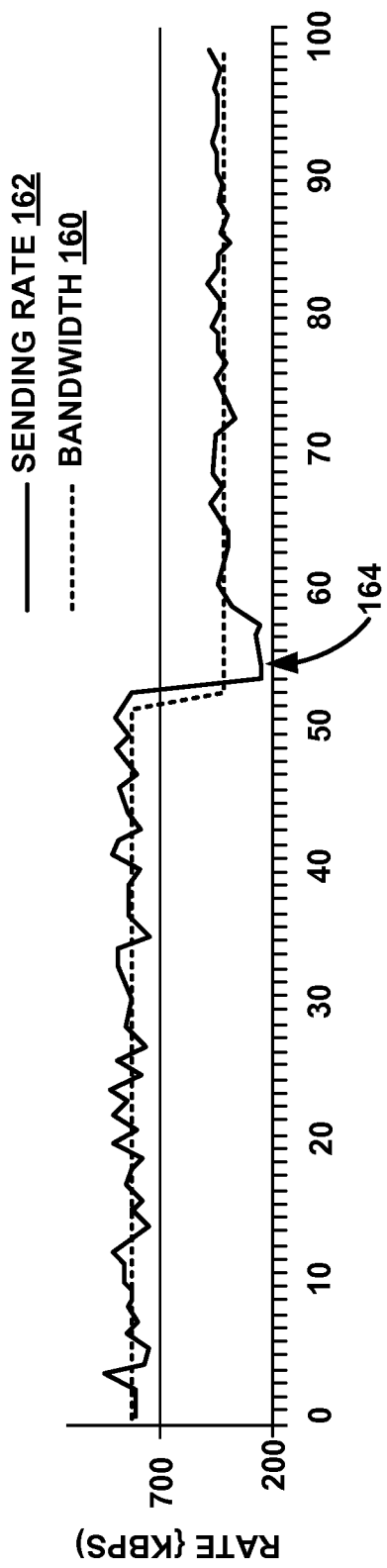
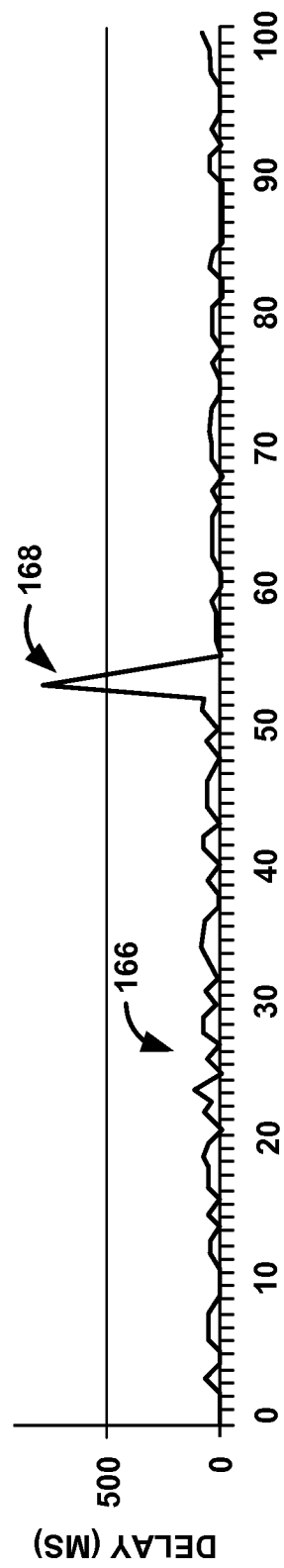
FIG. 7A
FIG. 7B

RECEIVER DRIVEN UP-SWITCHING IN VIDEO TELEPHONY

This application claims the benefit of U.S. Provisional Application No. 62/030,513, filed Jul. 29, 2014 the entire content of which is incorporated by reference herein.

TECHNICAL FIELD

This disclosure relates to the processing of video data.

BACKGROUND

Video telephony (VT) involves the real-time communication of packets carrying audio and video data. A VT device includes a video encoder that obtains video from a video capture device, such as a video camera or video archive, and generates video packets. Similarly, an audio encoder in a VT device obtains audio from an audio capture device, such as a microphone or speech synthesizer, and generates audio packets. The video packets and audio packets are placed in a radio link protocol (RLP) queue. A medium access control (MAC) layer unit generates medium access control (MAC) layer packets from the contents of the RLP queue. The MAC layer packets are converted to physical (PHY) layer packets for transmission across a communication channel to another VT device.

In mobile VT applications, a VT device receives the physical layer packets via a wireless forward link (FL) (or "downlink") from a base station to the VT device as a wireless terminal. A VT device transmits the PHY layer packets via a wireless reverse link (RL) (or "uplink") to a base station. Each VT device includes PHY and MAC layers to convert the received PITY and MAC layer packets and reassemble the packet payloads into audio packets and video packets. A video decoder within the VT device decodes the video data for presentation to a user via a display device. An audio decoder within the VT device decodes the audio data for output via an audio speaker.

SUMMARY

Techniques of this disclosure relate to determining a bit rate for encoding data based on network conditions. For example, aspects of this disclosure relate to reducing a sending bit rate (also simply referred to as rate) from a first rate to a second rate in response to a reduction in a network link rate. According to aspects of this disclosure, upon identifying the reduction in the network link rate, a sender device may reduce the sending rate to a reduced rate that is below the second network link rate, e.g., undershoot the second network link rate. The sender device may maintain the sending rate at the reduced rate for a time period that is based on the reduced rate and based on a duration between identifying the reduction in the network link rate and reacting to the reduction in the network link rate during which data is buffered at the sender device or at another device associated with the network. In this way, the sender device may reduce the amount of data that has been buffered during a decline in network link rate relatively quickly without overly impacting the user experience.

Aspects of this disclosure also relate to increasing a sending rate in instances in which a network link rate is not being fully utilized. For example, according to aspects of this disclosure, a receiver device may determine that a network link rate is underutilized based on data being received at the receiver device prior to the time at which the data is scheduled to be played out. The receiver device may determine an allowable excess delay parameter based on a difference in time between a time at which data is received and a time at which the data is scheduled to be played out. The receiver device may determine a sending rate increase according to the allowable excess delay parameter. The receiver device may, in some instances, transmit an indication of the sending rate increase to a sender device, so that the sender device may better utilize the network link rate without exceeding the network link rate.

In an example, a method of processing data includes transmitting data over a network at a first hit rate, identifying a reduction in a network link rate of the network from a first network link rate to a second network link rate, in response to identifying the reduction in the network link rate, determining a recovery bit rate at which to transmit the data over the network, wherein the recovery bit rate is less than the second network link rate, determining a buffering duration based on a difference between a time of the identification of the reduction in the network link rate and an estimated actual time of the reduction in the network link rate, and determining a recovery rate duration during which to transmit the data at the recovery bit rate based on the recovery bit rate and the buffering duration.

In another example, a device for processing data includes a memory configured to store data, and one or more processors, the one or more processors configured to transmit the data over a network at a first bit rate, identify a reduction in a network link rate of the network from a first network link rate to a second network link rate, in response to identifying the reduction in the network link rate, determine a recovery bit rate at which to transmit the data over the network, wherein the recovery bit rate is less than the second network link rate, determine a buffering duration based on a difference between a time of the identification of the reduction in the network link rate and an estimated actual time of the reduction in the network link rate, and determine a recovery rate duration during which to transmit the data at the recovery bit rate based on the recovery bit rate and the buffering duration.

In another example, an apparatus for processing data includes means for transmitting data over a network at a first bit rate, means for identifying a reduction in a network link rate of the network from a first network link rate to a second network link rate, means for determining, in response to identifying the reduction in the network link rate, a recovery bit rate at which to transmit the data over the network, wherein the recovery bit rate is less than the second network link rate, means for determining a buffering duration based on a difference between a time of the identification of the reduction in the network link rate and an estimated actual time of the reduction in the network link rate, and means for determining a recovery rate duration during which to transmit the data at the recovery bit rate based on the recovery bit rate and the buffering duration.

In another example, a non-transitory computer-readable medium has instructions stored thereon that, when executed, cause one or more processors to transmit data over a network at a first bit rate, identify a reduction in a network link rate of the network from a first network link rate to a second network link rate, determine, in response to identifying the reduction in the network link rate, a recovery bit rate at which to transmit the data over the network, wherein the recovery bit rate is less than the second network link rate, determine a buffering duration base d on a difference between a time of the identification of the reduction in the network link rate and an estimated actual time of the reduction in the network link rate, and determine a recovery rate duration during which to transmit the data at the recovery bit rate based on the recovery bit rate and the buffering duration.

In another example, a method of processing data includes determining, by a receiver device, an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device, determining, by the receiver device, a sender bit rate increase for increasing a bit rate at which data is to be sent from the sender device to the receiver device based on the determined allowable excess delay parameter, and transmitting an indication of the sender bit rate increase to the sender device.

In another example, a receiver device for processing data includes a memory configured to store data, and one or More processors configured to determine an allowable excess delay parameter based on a difference between a time at which the data is received by the receiver device and a time at which the data is scheduled to be played out, wherein the allowable excess delay parameter indicates an amount of delay that is supportable by a channel between a sender device and the receiver device determine a sender bit rate increase for increasing a bit rate at which data is to be sent from the sender device to the receiver device based on the determined allowable excess delay parameter, and transmit an indication of the sender bit rate increase to the sender device.

In another example, an apparatus for processing data includes means for determining an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device, means for determining a sender bit rate increase for increasing a bit rate at which data is to be sent from the sender device to the receiver device based on the determined allowable excess delay parameter, and means for transmitting an indication of the sender bit rate increase to the sender device.

In another example, a non-transitory computer-readable medium has instructions stored thereon that, when executed, cause one or more processors to determine an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device, determine a sender bit rate increase for increasing a bit rate al which data is to be sent from the sender device to the receiver device based on the determined allowable excess delay parameter, and transmit an indication of the sender bit rate increase to the sender device.

The details of one or more examples of the disclosure are set forth in the accompanying drawings and the description below. Other features, objects, and advantages will be apparent from the description, drawings, and claims.

BRIEF DESCRIPTION OF DRAWINGS

FIGS. 7A and 7B are graphs illustrating a work link rate decline and a corresponding delay lime, respectively.

DETAILED DESCRIPTION

Figure 1:
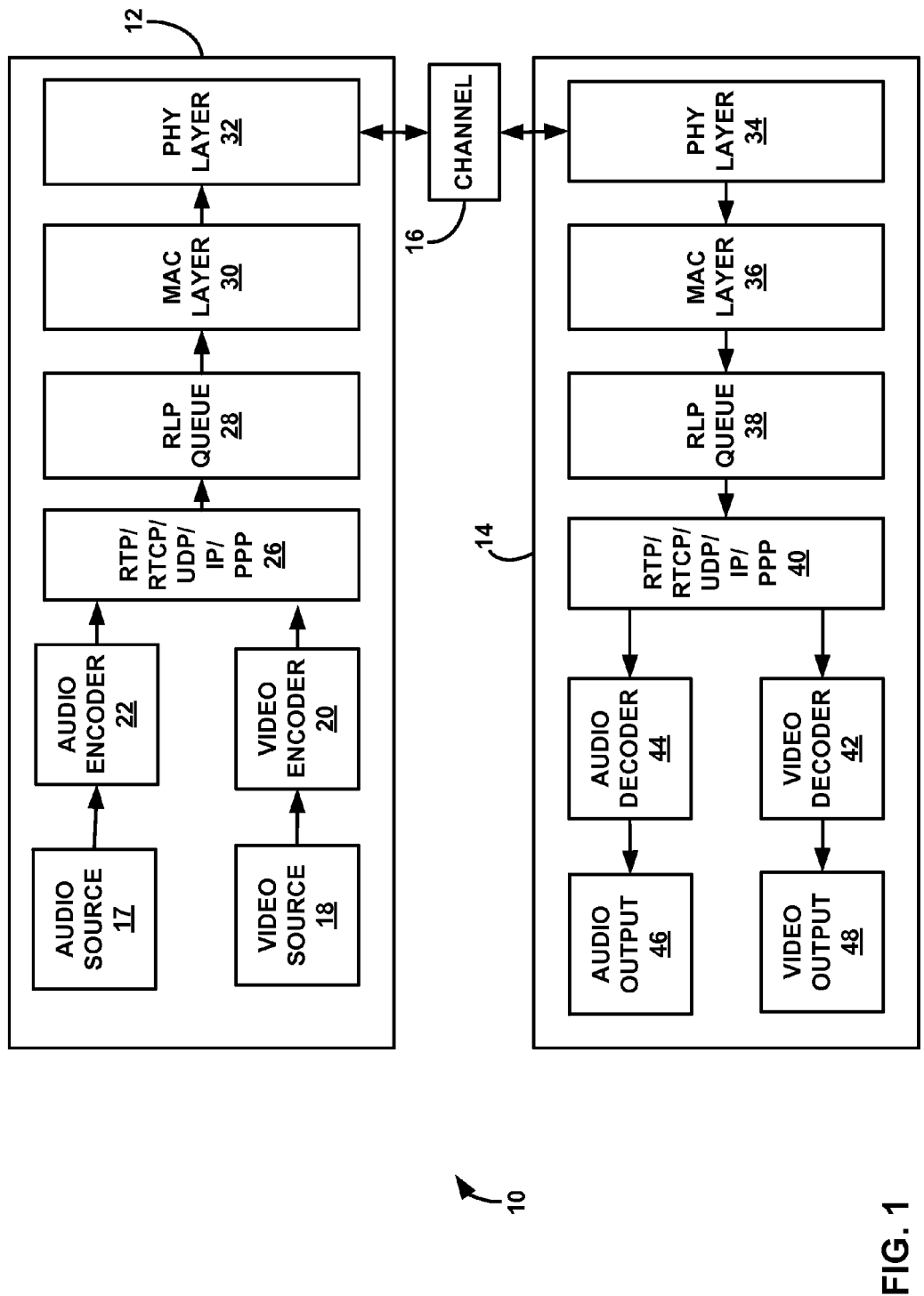
FIG. 1 is a block diagram illustrating an audio/video encoding and decoding system for video telephony (VT) applications.

Video telephony (VT) devices may be connected via a wired or wireless network for conducting a VT session (e.g., transmission of audio and/or video data between the VT devices). A VT device that is processing audio and/or video data for transmission to another VT device may be referred to as a sender device. Likewise, a VT device that is processing received audio and/or video data (e.g., for presentation to a user of the VT device) may be referred to as a receiver device.

The sender device may encode audio and/or video data at a particular rate (which may be interchangeably referred to herein as a bit rate). The sender device may select the rate based on network conditions. For example, the sender device may select the rate based on a maximum (or near maximum) network link rate supported by the network being used for the VT session. In this way, the sender device may prepare the data to be sent using the relatively highest quality supported by the network without exceeding the limitations of the network.

In some instances, the network link rate connecting VT devices may vary, particularly when using VT over a wireless network such as Wi-Fi Of cellular networks. In some instances, network equipment may use buffers to handle link rate fluctuations and/or to perform queue management. For example, a sender device may include a buffer for buffering encoded audio and/or video data prior to transmitting the data to the receiver device. A sudden reduction in the network link rate may cause a bottleneck that may adversely impact the VT session. For example, when the network link rate is reduced, the sender device to accumulate encoded video data in the buffer, which may cause interruptions and/or jerkiness in the VT session at the receiver device.

A sender device may alter a rate at which video data is sent (which may be referred to herein as a sending rate, rate being used throughout the disclosure to refer to a bit rate) in response to a reduction in the network link rate. In some examples, the sender device may alter the sending rate by changing the rate at which audio and/or video data is encoded. However, there may be a reaction delay in reducing the rate due to receiver device congestion control feedback delays, delays in a return path from a receiver device to the sender device, rate adaptation reaction delays, or the like. Accordingly, the sending rate may remain significantly above the network link rate for a period of time after a reduction in the network link rate. A mismatch in the sending rate and the network link rate may result in increased buffer levels at the bottleneck and, hence, increased end-to-end delay (or even lost packets), which may adversely impact the quality experience of a VT session.

In addition, even after the sender device decreases the sending rate in response to a reduction in network link rate, a built-up delay may persist for some time. For example, in general, delay may refer to the time between data being available for transmission across a network link and the time the data is actually transmitted to the network. Accordingly, delay may be associated with the buffering of data. For example, an increase in delay results in increased buffer levels, because data must be stored after encoding and prior to transmission to the network.

Depending on the difference between the sending rate and the bottleneck network link rate, the sender device may reduce the quantity of buffered data relatively slowly. That is, if the difference between the reduced sending rate and the network link rate is relatively small, the sender device may reduce the built-up delay relatively slowly and the impact to the VT session may persist.

One approach to reducing the quantity of buffered data is to reduce the sending rate below an estimated network link rate. A relatively conservative approach, e.g., using a sending rate that is significantly below the estimated network link rate, may result in an underuse of the link and an overall reduction in video quality experience at the receiver device. However, such a conservative approach may also reduce the bottleneck link buffers relatively quickly. Conversely, a relatively aggressive approach, e.g., only reducing the sending rate to the network link rate, may result in full use of the link and higher quality encoded data. However, as noted above, such an approach may cause data to remain in a buffer for a relatively lone: period of time.

Aspects of this disclosure relate to determining a sending rate (e.g., a bit rate for encoding audio and/or video data at a sender device) based on network conditions. In particular, the techniques include reducing a sending rate in response to a reduction in a network link rate. According to aspects of this disclosure, upon identifying a reduced network link rate, a sender device may reduce the sending rate to orate that is below the network link rate. In some examples, a receiver device may request a reduced sending rate that is then implemented by the sender device. Reducing the sending rate to orate that is below the network link rate may be referred to as undershooting the network link rate.

The techniques also include determining an amount of lime to maintain the sending rate at the reduced rate. In some examples, aspects of this disclosure include determining a recovery rate duration (also referred to as an undershoot period) based on a buffering duration, a magnitude of the reduction in the network link rate, a rate reduction factor, and/or other factors, as described in greater detail below. In this way, the techniques may be used to determine an optimal undershoot period. For example, a sender device may maintain the reduced sending rate for only as long as needed to reduce a quantity of buffered data before returning to an increased sending rate that is supported by the network. The techniques may achieve a balance between the conservative approach and the aggressive approach described above, such that the amount of data that is buffered may b reduced relatively quickly without overly impacting the user experience.

Aspects of this disclosure also include signaling delay data associated with processing encoded audio and/or video data. The techniques of this disclosure include generating data for use in determining a buffering duration at a sender device. The buffering duration may be associated with a delay between the decline in the actual network link rate and the time at which the decline in the network link rate is detected (e.g., assuming that the sender and/or receiver device does not recognize and react to a decline in the network link rate immediately). During this lag time, a sender device typically buffers data that is prepared/encoded at the original sending rate, but that cannot be sent in real-time (or near real-time) at the reduced network link rate. The buffering of data creates a delay at the receiver device during which data is not received. As noted above, the buffering time may be used to determine an amount of data that is buffered at the sender device and/or the recovery rate duration.

Other aspects of this disclosure may relate to increasing a sending rate in instances in which a network link rate is not being fully utilized. For example, a sender device may increase a sending rate of data to increase the quality of the user experience instances in which the sending rate is less than the link rate that is supportable by a network linking the sender device to a receiver device increasing the bit rate at which data is encoded may be referred to herein as up-switching. However, up-switching the sending rate at an increment that is too large may result in an overshoot of the network link rate, which may degrade the user experience in the manner described. Conversely, up-switching the sending rate at an increment that is too small may result in a continued undershoot of the network link rate, which may result in a lower quality user experience than is supportable by the network link rate.

According to aspects of this disclosure, a receiver device may determine that a network link rate is underutilized based on data being received prior to the time at which the data is scheduled to be played out. The receiver device may determine an allowable excess delay parameter based on the difference between a time at which data is received and the time at which the data is scheduled to be played out, and the receiver device may determine a sending rate increase according to the allowable excess delay parameter. The receiver device may, in some instances, transmit an indication of the sending rate increase to a sender device, so that the sender device may better utilize the network link rate without overshooting the network link rate.

Accordingly, aspects of this disclosure include rate adaptation or congestion control techniques for controlling a video flow originating from a sender device and transmitted aver a network channel (also referred to as a network link) with time-varying bandwidth to a receiver device. In particular, the techniques include up-switching the average bit rate of a video flow in a controlled manner to improve the user experience without introducing congestion in the network. Such rate adaptation techniques may avoid significantly increasing the end-to-end delay which could result in packet losses.

For example, according to aspects of this disclosure, a receiver device may examine received video packets and determine whether the data is arriving early, in time, or too late for the scheduled playout of the data. If the data is arriving later than the intended playout, the receiver device may determine that the network link rate is lower than the sending rate (e.g., the encoding rate implemented at the sender device). Accordingly, the receiver device may send a request to the sender device to decrease the sending rate. In some examples, the receiver device may request an initial rate that is lower than a sustainable rate (e.g., an available bandwidth) of a network link rate to allow the system to decongest the network channel.

In some instances, the techniques described herein may be performed by a Multimedia Telephony Service for IP Multimedia Subsystem (IMS) (MTSI) device. For example, the MTSI device may perform bit rate adaptation and/or congestion control using the techniques described herein.

FIG. 1 is a block diagram illustrating an encoding and decoding system 10. As shown in FIG. 1, system 10 includes an encoder system 12 and a decoder system 14 connected by a transmission channel 16. In the example of FIG. 1, encoder system 12 is associated with a first video communication device and includes an audio source 17, video source 18, video encoder 20, audio encoder 22, real-time transport protocol (RTP)/real-time transport protocol (RTCP)/user datagram protocol (ODP)/Internet protocol (IP)/point-to-point protocol (PPP) conversion unit 26, radio link protocol (RLP) queue 28, MAC layer unit 30 and physical (PHY) layer unit 32. Decoder system 14 is associated with another video communication device and includes a PHY layer unit 34, MAC layer unit 36, RLP queue 38, RTP/RTCP/UDP/IP/PPP conversion unit 40, video decoder 42, audio decoder 44, audio output device 46 and video output device 48.

As described in more detail below, encoder system 12 and/or decoder system 14 may use the techniques of this disclosure to modify an encoding rate based on network conditions. For example, video encoder 20 may control the video source encoding rate, at least in part, as a function of network bandwidth. In particular, video encoder 20 may reduce an encoding rate of video and/or audio data in response to a reduction in a network link rate. Likewise, video encoder 20 may increase an encoding rate of video and/or audio data in response to an indication of underutilization of a network link rate.

System 10 may provide bi-directional video and audio transmission, e.g., for video telephony via transmission channel 16. Accordingly, generally reciprocal encoding, decoding, and conversion units may be provided on opposite ends of channel 16. In some embodiments, encoder system 12 and decoder system 14 may be embodied within video communication devices such as wireless mobile terminals equipped for video streaming, video telephony, or both. The mobile terminals may support VT according to packet-switched standards such as RTP, RTCP, UDP, IP, or PPP.

For example, at encoder system 12, RTP/RTCP/UDP/IP/PPP conversion unit 26 adds appropriate RTP/RTCP/UDP/IP/PPP header data to audio and video data received from video encoder 20 and audio encoder 22 and places the data in RLP queue 28. An example bitstream may include a MAC header, an IP header, a UDP header, an RTCP header, and the payload data. In some examples, RTP/RTCP runs on top of UDP, while UDP runs on top of IP, and IP runs on top of PPP. In some examples, as described herein, RTP/RTCP/UDP/IP/PPP conversion unit 26 in conform to a particular standard, such as "RFC 3550: RTP: A Transport Protocol for Real-Time Applications," H. Schulzrinne et al., July 2003, "RFC 5104: Codec Control Messages in the RTP Audio-Visual Provide with Feedback (AVPF)," S. Wenger et al., February 2008 (hereinafter RFC 5104), and/or other applicable standards for real-time or near real-time transport of data. MAC layer unit 30 generates MAC RLP packets from the contents of RLP queue 28. PHY layer unit 32 converts the MAC RLP packets into PHY layer packets for transmission over channel 16.

PHY layer unit 34 and MAC layer unit 36 of decoder system 14 operate in a reciprocal manner. PITY layer unit 34 converts PITY layer packets received from channel 16 to MAC RLP packets. MAC layer unit 36 places the MAC RLP packets into RLP queue 38. RTP/RTCP/UDP/IP/PPP conversion unit 40 strips the header information from the data in REP queue 38, and reassembles the video and audio data for delivery to video decoder 42 and audio decoder 44, respectively.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. Typically, for VT applications, system 10 may be designed to support high data rate (HDR) technologies.

Video encoder 20 generates encoded video data according to a video compression method, such as MPEG-4, High Efficiency Video Coding (HEVC), another video coding standard. Other video compression methods include the International Telecommunication Union (ITU) H.263, ITU H.264, or MPEG-2 methods. Audio encoder 22 encodes audio data to accompany the video data. Video source 18 may be a video capture device, such as one or more video cameras, one or more video archives, or a combination of video cameras and video archives.

The audio data may be encoded according to an audio compression method, such as adaptive multi-rate narrow band (AMR-NB), of other techniques. The audio source 17 may be an audio capture device, such as a microphone. Of a speech synthesizer device. For VT applications, the video will permit viewing of a party to a VT conference and the audio will permit the speaking voice of that party to be heard.

In operation, RTP/RTCP/UDP/IP/PPP conversion unit 26 obtains video and audio data packets from video encoder 20 and audio encoder 22. As mentioned previously, RTP/RTCP/UDP/IP/PPP conversion unit 26 adds appropriate header information to the audio packets and inserts the resulting data within RIP queue 28. Likewise, RTP/RTCP/UDP/IP/PPP conversion unit 26 adds appropriate header information to the video packets and inserts the resulting data within RLP queue 28, MAC layer unit 30 retrieves data from RLP queue 28 and forms MAC layer packets. Each MAC layer packet carries RTP/RTCP/UDP/IP/PPP header information and audio or video packet data that is contained within RLP queue 28. Audio packets may be inserted into RLP queue 28 independently of video packets.

In some cases, a MAC layer packet generated from the contents of RLP queue 28 will carry only header information and video packet data. In other cases, the MAC layer packet will carry only header information and audio packet data. In many cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer unit 32 converts the MAC RLP audio-video packets into PHY layer packets for transmission across channel 16.

Channel 16 carries the PHY layer packets to decoder system 14. Channel 16 may be any physical connection between encoder system 12 and decoder system 14. For example, channel 16 may be a wired connection, such as a local or wide-area wired network. Alternatively, as described herein, channel 16 may be a wireless connection such as a cellular, satellite or optical connection. Channel conditions may be a concern for wired and wireless channels, but may be particularly pertinent for mobile VT applications performed over a wireless channel 16, in which channel conditions may suffer due to fading or congestion, Channel 16 may support a particular network link rate (e.g., a particular bandwidth), which may fluctuate according to channel conditions. For example, channel 16 may be characterized by a reverse link (RL) having a throughput that varies according to channel conditions.

In general, PHY layer unit 34 of decoder system 14 identifies the MAC layer packets from the PHY layer packets and reassembles the content into MAC RLP packets. MAC layer unit 36 then reassembles the contents of the MAC RLP packets to provide video and audio packets for insertion within RLP queue 38. RTP/RCTP/UDP/IP/PPP unit 40 removes the accompanying header information and provides video packets to video decoder 42 and audio packets to audio decoder 44. Video decoder 42 decodes the video data frames to produce a stream of video data for use in driving a display device. Audio decoder 44 decodes the audio data to produce audio information for presentation to a user, e.g., via an audio speaker.

As noted above, system 10 may provide bi-directional video and audio transmission, e.g., for video telephony via transmission channel 16. In some examples, an issue may occur when a network link rate of channel 16 varies, which may occur with cellular, or other network links. As described in greater detail with respect to FIG. 2 below, one or more buffers may be included in network equipment to handle rate fluctuations and potentially to perform queue management.

For example, a VT flow with a certain sending rate (e.g., an encoding rate used by video encoder 20) may experience a sudden drop in the link rate, which may create a bottleneck for the flow. Due to a reaction delay at encoder system 12 to this link rate drop (e.g., which may be caused by receiver congestion control feedback delays, delays on the return path from receiver to sender, rate adaptation reaction delays, or the like) the sending rate may stay significantly above the link rate for a period of time. This may result in increased buffer levels at the bottleneck link and, hence, increased end-to-end delay (or even lost packets) between encoder system 12 and decoder system 14, which may adversely affect the quality experience of the VT session.

After encoder system 12 decreases the bit rate at which data is transmitted over channel 16 (e.g., decreases the sending rate), the built-up delay may persist for some time. For example, in some instances, the length of time that the built-up delay persists may depend on the difference between the sending rate and the reduced link rate (e.g., the link rate causing the bottleneck). If the decrease in the sending rate is too small, the the built-up delay will decrease relatively slowly, which may impact the user experience at decoder system 14. A conservative sending rate approach is to consistently send at a significantly lower rate than the estimated link rate. However, this approach may result underuse of the link at channel 16 and an overall reduced video quality experience.

In accordance with the techniques described in this disclosure, video encoder 20 may encode video from video source 18 based on conditions of channel 16 in particular, video encoder 20 may reduce an encoding rate (also referred to herein as a sending rate) based a reduction in bandwidth at channel 16. Reducing the encoding rate may be referred to herein as down-switching. Encoder system 12 may temporarily reduce the sending rate of data encoded at video encoder 20 after a significant drop in the link rate at channel 16 is detected, for example, after a receiver side congestion control feedback message generated at decoder system 14 has been received at encoder system 12.

In one example, according to aspects of this disclosure, encoder system 12 may initially transmit data over channel 16 at a first bit rate. Encoder system 12 may identify a reduction in a network link rate at channel 16 from a first network link rate to a second network link rate. In some examples, encoder system 12 may identify the reduction in the network link rate based on one or more reports received from decoder system 14.

According to aspects of this disclosure, in response to identifying the reduction in the network link rate, encoder system 12 may determine a recovery bit rate at which to transmit the data over channel 16, where the recovery bit rate is less than the second network link rate. Encoder system 12 may also determine a buffering duration that includes a difference between a time of the identification of the reduction in the network link rate and an estimated actual time of the reduction in the network link rate. For example, as noted above, there may be some reaction time associated with identifying the delay and adjusting the rate at which video encoder 20 encodes data. Encoder system 12 may buffer data encoded by video encoder 20 at or near the initial (higher) network link rate until video encoder 20 has time to identify and adjust the encoding rate to a lower rate.

Encoder system 12 may determine a recovery rate duration during which to transmit the data at the recovery bit rate based on the recovery bit rate and the buffering duration. Encoder system may then transmit the data at the recovery bit rate for the determined recovery rate duration. In this way, the techniques may reduce the built-up end-to-end delay relatively quickly and may preserve the quality of the user experience by using the available link rate after the end-to-end delay has been reduced (e.g., versus than maintaining the sending rate at the reduced rate for an extended period of time). While described with respect to encoder system 12 for purposes of example, it should be understood that certain of the above-noted techniques may additionally or alternatively be performed by decoder system 14.

Still other techniques of this disclosure include techniques for up-switching (e.g., increasing) the rate at which data is encoded based on network conditions. For example, during the presentation of "Discussion on Upswitch Principals," SA4 MTS1 SWG Conference Call No. 4 on End-to-End Video Rate Adaptation of E2EMTSI-S4, S4-AHM215, Jun. 24, 2014, ("AHM215") a number of issues with up-switching were identified. As documented in "Report from SA4 MTSI SWG Conference Call No. 4 on End-to-End Video Rate Adaptation of E2EMTSI-S4 (Jun. 24, 2014)," Tdoc S4 (14)0768, further discussion was felt needed to investigate the new ideas from the conference call before agreeing on the principles for the up-switch.

In general, the model presented in AHM215 relies on a ramp-up probing model, which may have a disadvantage in that the probing may introduce delay into the system when the probe does not match the channel conditions. A more robust model is to allow a receiver, such as decoder system 14, to passively measure the state of channel 16 to determine whether there could be excess capacity in the system. Based on this, decoder system 14 may make a more accurate estimate of the sustainable rate of the system.

The model presented in AHM215 also suggests a two-phase approach whereby encoder system 12 first probes the channel to see if there might be more capacity. If the probing phase is successful, video encoder 20 may more aggressively increase its rate during a "ramp-up phase." Such a model can introduce a relatively large amount of congestion into the system, because a successful probe with a small increase in data rate may not imply that the system can handle a much larger increase afterwards. In fact, when increasing the rate of video encoder 20 to match the system capacity, the More robust approach is to first to increase the rate by a relatively large amount, followed by taking smaller steps as the rate converges to the sustainable rate supported by channel 16.

To follow the potentially more robust approach of converging on the sustainable rate in the manner described above, the entity driving the adaptation (e.g., the sender (encoder system 12) or receiver (decoder system 14) must have an estimate of the sustainable rate of the system. A sender may rely on RTCP receiver reports to detect end-to-end channel conditions and can calculate the net throughput, albeit with some measurement delay due to the RTCP reporting. A receiver may calculate both a net throughput and an amount of additional delay that may be accepted before packets arrive too late at decoder system 14 for their scheduled playout. Therefore, if the relevant metrics calculated at the receiver are sent directly to the sender, a receiver-driven adaptation model is achieved and may be more robust and should be used in determining the minimum adaptation performance.

According to aspects of this disclosure, decoder system 14 may implement a receiver-driven rate up-switching technique upon determining that the bandwidth at channel 16 is being underutilized. For example, according to aspects of this disclosure, decoder system 14 may provide data to encoder system 12 that prompts video encoder 20 to increase an encoding rate.

In some examples, according to aspects of this disclosure, decoder system 14 may determine an allowable excess delay parameter based on a difference between a time at which data is received by decoder system 14 and a time at which the received data is scheduled to be played out. The allowable excess delay parameter may indicate an amount of delay that is supportable by channel 16 before a user experience is impacted, e.g., data arrives too late to be decoded and played out at the appropriate time. Decoder system 14 may also determine a sender bit rate increase for increasing a bit rate at which data is to be sent from encoder system 12 to decoder system 14 based on the determined allowable excess delay parameter. Decoder system 14 may also transmit an indication of the sender bit rate increase to encoder system 12.

In this way, decoder system 14 may control the average bit rate of the video flow in a controlled manner to improve the user experience without introducing congestion in the network. The techniques may avoid significantly increasing the end-to-end delay, which could result in packet losses.

Figure 2:
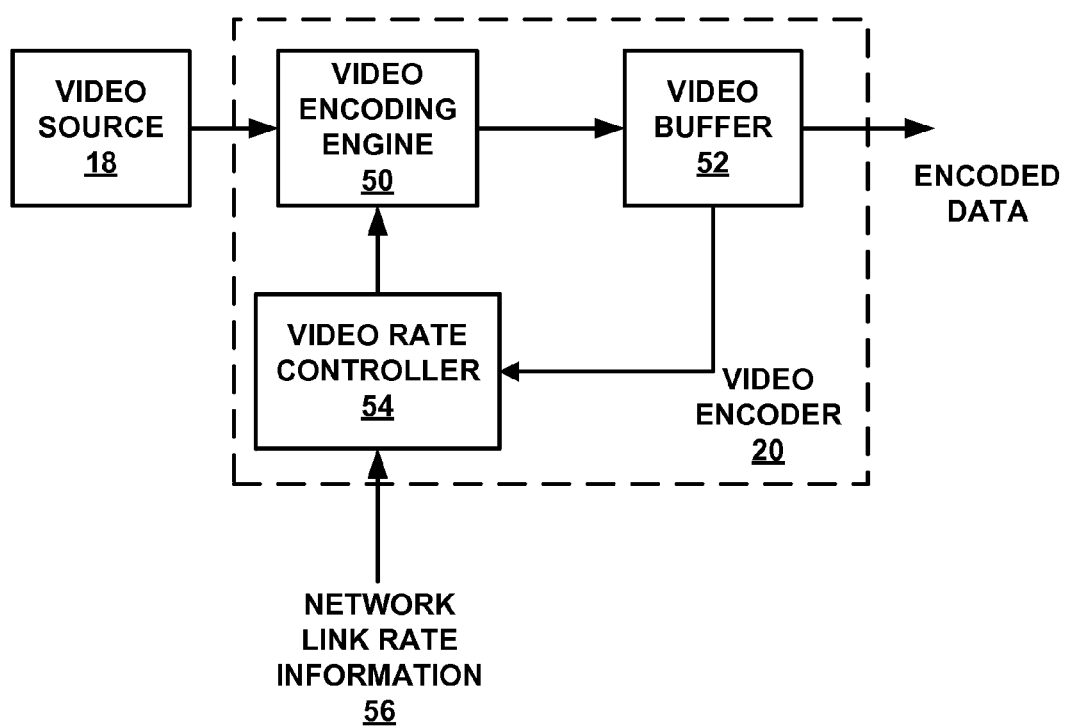
FIG. 2 is a block diagram illustrating a video encoding system that may implement video source rate adaptation consistent with the techniques of this disclosure.

FIG. 2 is a block diagram illustrating encoder system 12 that may implement video source rate adaptation in accordance with the techniques of this disclosure. As shown in Ha 2, video encoder 20 includes a video encoding engine 50, video buffer 52 and video rate controller 54. Video encoder 20 also receives network link rate information 56, which may be prepared by decoder system 14 (as described in greater detail below).

Video encoding engine 50 obtains video data from video source 18 and encodes the video data at a rate controlled by video rate controller 54. Video encoding engine 50 then places the encoded video in video buffer 52. Video rate controller 54 may monitor the fullness of video buffer 52 and control the video encoding rate applied by video encoding engine 50, at least in part, based on the fullness. In addition, as described in greater detail below, video rate controller 54 may control the rate based on the network link rate information 56 and/or other data associated with conditions of channel 16 (FIG. 1).

In some examples, video encoder 20 may provide a video source rate control scheme that is generally CODEC-independent. For example, video encoder 20 may be adapted for video encoding according to HEVC, MPEG4, ITU H.263 or ITU H.264. In addition, video encoder 20 may be susceptible to implementation within a DSP or embedded logic core. In some embodiments, video encoder 20 (e.g., video rate controller 54 of video encoder 20) may apply model-based rate control, e.g., applying video block rate control in the rho domain. For example, once a frame bit budget is established for a particular video frame, the frame bit budget may be allocated among the video blocks, e.g., coding units (CUs) and/or macroblocks (MBs), within the frame using rho domain rate control. The rho domain values for individual MBs can then be mapped to quantization parameter (QP) values.

According to aspects of this disclosure, video rate controller 54 may perform rate down-switching based on network conditions. For example, video encoding engine 50 may initially encode data at a first bit rate for transmission over a transport medium, such as channel 16 (FIG. 1). Video rate controller 54 may identify a reduction in a network link rate from a first network link rate to a second network link rate. In some examples, video rate controller 54 may identify the reduction in the network link rate from feedback at video encoder 20. In other examples, video rate controller 54 may identify the reduction in the network link rate based on network link rate information 56.

In response to identifying the reduction in the network link rate, video rate controller 54 may determine a recovery bit rate for video encoder 20 that is less than the second (reduced) network link rate. The recovery rate may be used to reduce the amount of data has been buffered between the actual time of the decrease in the network link rate and the identification of the decrease in the network link rate. Reducing such buffered data may help to ensure that the user experience is not impacted at the receiver device. Hence, video rate controller 54 may determine a recovery bit rate for use at video encoder 20 that undershoots the reduced network link rate in order to diminish amount of buffered data at video encoder 20.

According to aspects of this disclosure, video rate controller 54 may determine the recovery rate based on an undershoot factor. Video rate controller 54 may determine the undershoot factor based on the difference between the first network link rate and the reduced network link rate. That is, video rate controller 54 may determine an undershoot factor that has a magnitude that varies based on the magnitude of the reduction in the network link rate. Accordingly, if the reduction in the network link rate is relatively high, video rate controller 54 may determine an undershoot factor that is relatively high. Likewise, if the reduction in the network link rate is relatively low, video rate controller 54 may determine an undershoot factor that is relatively low.

In some examples, video rate controller 54 may determine an undershoot factor that may be applied to the reduced network link rate to determine the recovery rate. For example, video rate controller 54 may determine a fractional undershoot factor and may apply the fractional undershoot factor to the reduced network link rate to determine the recovery rate. In one example, video rate controller 54 may determine the undershoot factor based on a ratio of the magnitude in the reduction in the network link rate to the first network link rate.

According to aspects of this disclosure, video rate controller 54 may determine how long to maintain the recovery rate based on how much data is buffered at video encoder 20 (or, more generally, how much data is buffered at a sender device that includes video encoder 20) between the time of the identification of the reduction in the network link rate and an estimated actual time of the reduction in the network link rate. The time associated with buffering the data at the sender device may be referred to herein as the buffering duration (or buffering time period), while the duration with which to maintain the recovery rate may be referred to herein as a recovery rate duration (or reduced rate time period). In some instances, the recovery rate duration may also be referred to as an undershoot duration or period, because the rate at which data is encoded during the recovery rate duration is less than the network link rate.

As described in greater detail with respect to FIG. 5 below, video rate controller 54 may determine the buffering duration in a variety of ways. For example, video rate controller 54 may determine the buffering duration by estimating the buffering duration from network link rate information 56, such as round-trip-time (RTT) between the sender device that incorporates video encoder 20 and a receiver device, downlink delays (e.g., receiver to sender delays), data regarding a rate adaptation reaction delay, a reaction delay of the congestion control (e.g., estimation of link rate), message generation delays (RTCP packets), or the like. The network link rate information 56 may be available at video encoder 20 or may be signaled to video encoder 20 by the receiver device.

According to aspects of this disclosure, video rate controller 54 may determine the recovery rate duration based on a magnitude of the recovery rate and based on the buffering duration. In some examples, video rate controller 54 may determine a buffering duration that is proportional to the magnitude of the reduction of the network link rate (e.g., as indicated by the recovery rate) and the amount of time associated with reacting to the reduction of the network link rate (e.g., as indicated by the buffering duration). That is, if the reduction in the network link rate is relatively place and/or the time needed to react to the reduction in the network link rate is relatively long video rate controller 54 may determine a recovery rate duration that is proportionately long. Likewise, if the reduction in the network link rate is relatively small and/or the time needed to react to the reduction in the network link rate is relatively short, video rate controller 54 may determine a recovery rate duration that is proportionately short.

According to other aspects of this disclosure, video rate controller 54 may additionally or alternatively perform rate up-switching based on network conditions. For example, video rate controller 54 may receive network link rate information 56 from a receiver device such as a device that includes decoder system 14 (FIG. 1). Video rate controller 54 may use the received network link rate information 56 to up-switch the sending rate (e.g., encoding rate) being used by video encoding engine 50 to encode data.

In some examples, the received network link rate information 56 may include a particular requested sending rate (e.g., encoding rate) being implemented by video encoding engine 50. In other examples, the received network link rate information 56 may include a rate step increase to be added to a current sending rate (e.g., a sending rate step). In either case, as described in greater detail with respect to FIG. 3 below, the received network link rate information 56 may be based on an excess delay parameter that indicates that packets have been received at the receiver device before the packets are scheduled to be played out. In such instances, video rate controller 54 may increase the sending rate used by video encoding engine 50 until the arrival time of packets more closely coincides with the scheduled playout time of the packets at the receiver device.

It should be understood that, while the techniques of FIG. 2 are described as being carried out by a particular component of FIG. 2 (e.g., such as video rate controller 54), such techniques may additionally or alternatively be performed by one or more other components of a video telephony device. As an example, an MTSI device may carry out certain techniques described above to perform rate adaptation and/or congestion control. In this example, the MTSI device may then provide data to video rate controller 54 for implementing the appropriate rate control at video encoder.

Figure 3:
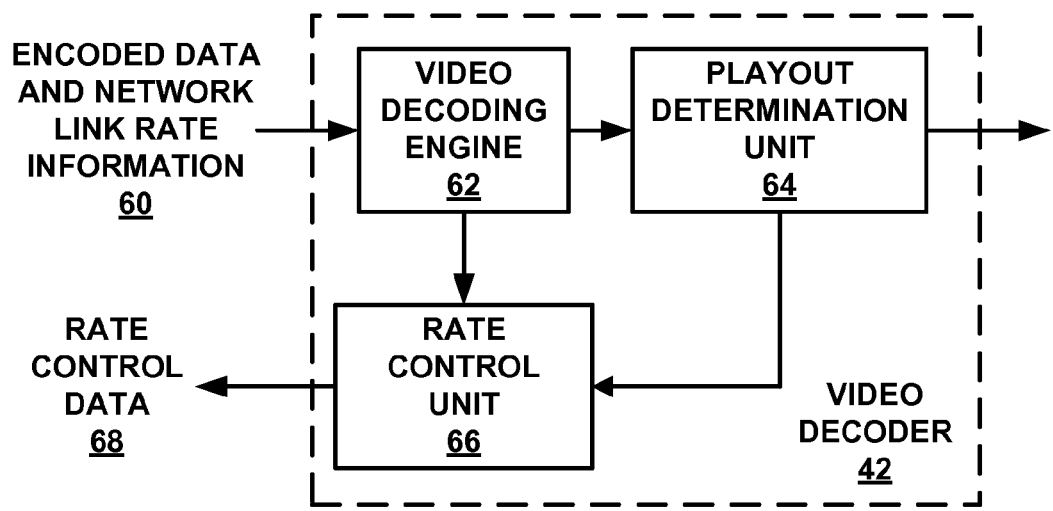
FIG. 3 is a block diagram illustrating a video decoding system that may implement video source rate adaptation consistent with the techniques of this disclosure.

FIG. 3 is a block diagram illustrating video decoder system 14 that may implement video source rate adaptation in accordance with the techniques of this disclosure. As shown in FIG. 3, video decoder 42 receives encoded data and network link rate information 60 and includes a video decoding engine 62, playout determination unit 64, and rate control unit 66 that generates a rate control data 68.

Video decoding engine 62 receives encoded data and network link rate information 60 and decodes the video data. In some examples, video decoding engine 62 may conform to one or more video coding standards. As noted above, example video coding standards include HEVC, MPEG4, ITU H.263 or ITU H.264.

The rate at which the video data is received may be controlled by video rate controller 54 of video encoder 20 (FIG. 2). According to aspects of this disclosure, rate control unit 66 may prepare and send rate control data 68 to video encoder 20 for use in adjusting the encoding rate. In some examples, rate control data 68 may include data for performing down-switching at the sender device. In other examples, additionally or alternatively, rate control data 68 may include data for performing up-switching at the sender device. Rate control unit 66 may prepare data that allows the sender device to determine the appropriate bit rate, or may request a particular bit rate from the sender device.

With respect to preparing data for down-switching, according to aspects of this disclosure, rate control unit 66 may determine a recovery rate, a buffering duration, and/or a recovery rate duration in a manner similar to that described above with respect to FIG. 2. In other examples, rate control unit 66 may generate data and/or transmit messages that may be used by a sender device (such as encoder system 12) to determine a recovery rate, a buffering duration, and/or a recovery rate duration.

In one example, rate control unit 66 may generate an RTCP Temporary Maximum Media Stream Bit Rate Request (TMMBR) message to the sender device with an estimated maximum bit rate for a forward channel to indicate a reduction in the network link rate. In general, as described in RFC 5104 noted above, a receiver, translator, or mixer may use a TMMBR (referred to as a "timber") to request a sender to limit the maximum bit rate for a media stream to, or below, the provided value. The Temporary Maximum Media Stream Bit Rate Notification (TMMBN) contains the media sender's current view of the most limiting subset of the TMMBR-defined limits it has received to help the participants to suppress TMMBR that would not further restrict the media sender.

According to aspects of this disclosure, a change in the estimated maximum bit rate for the forward channel from a first rate to a second, lower rate indicates a reduction in the network link rate. In some examples, rate control unit 66 may send the TMMBR immediately or nearly immediately after congestion is detected (e.g., there may be message generation delays associated with generating the TMMBR message). While a TMMBR message is described for purposes of illustration, it should be understood that a variety of other messages that indicate delays/congestion may be used.

To facilitate the sender device with estimating the buffering duration described herein, rate control unit 66 may also generate and transmit an RTCP receiver report (RR) message. For example, as described in RFC 3550 noted above, several RTCP packet types may be used to carry a variety of control information. A sender report (SR) may be used for transmission and reception statistics from participants that are active senders. An RR may be used for reception statistics from participants that are not active senders and in combination with SR for active senders reporting on more than 31 sources.

According to aspects of this disclosure, rate control unit 66 may generate and transmit an RR message after the TMMBR message, e.g., immediately or nearly immediately after the TMMBR message. In this example, the sender device may receive the TMMBR message and the RR message and may determine an upper bound for the buffering duration as a difference in time between the time of sending an SR that is referred to in the RR by the last SR timestamp (LSR data) included in the RR and the time that the RR is received by the sender device. In other words, rate control unit 66 may send first data that indicates a request for a bit rate limitation (e.g., the TMMBR message) and second data that indicates a time at which a message was generated (e.g., the LSR, data). The LSR data may include the middle 32 bits out of a 64 bit network time protocol (NTP) timestamp received as part of the most recent RTCP SR packet from a source. If no SR has been received yet, the LSR timestamp field may be set to zero. The sender device may receive the above-rioted data and may use the data to determine a buffering duration, which may be used during down-switching.

In another example, rather than sending two separate successive messages (e.g., a TMMBR and an RTCP RR), rate control unit 66 may group the TMMBR data and RTCP RR data into a single RTCP message and may send the single message to the sender device. At a minimum, rate control unit 66 may send the LSR data, which allows the sender device to estimate the buffering duration. In this example, the message size may be reduced relative to sending two separate messages.

In some examples, rate control unit 66 may use the LSR of the last received RTCP SR to send to the sender device, even if rate control unit 66 had previously sent a RTCP RR that has the same LSR. If rate control unit 66 had not yet sent an RR, rate control unit 66 may combine a full RR with the TMMBR. In other examples, to reduce the message size, rate control unit 66 may only send the LSR data together with the TMMBR, which the sender device may receive and use to determine the RTT. In still another example, if rate control unit 66 had already sent an RR, the sender device may compute the buffering duration more accurately as the time difference between the time of receiving the last received RR and the time of receiving the new RR (e.g., the RR that was sent by rate control unit 66 after congestion was detected).

Rate control unit 66 may also determine a recovery rate duration and/or generate and send data to a sender device to determine the recovery rate duration. For example, alternatively to or in combination with the techniques described above, rate control unit 66 (or the sender device) may monitor the RTCP RR inter-arrival jitter to determine when to end the recovery rate duration. In general, inter-arrival jitter data may provide an estimate of the statistical variance of the RTP data packet inter-arrival time, measured in timestamp units and expressed as an unsigned integer. The inter-arrival jitter J may be defined to be the mean deviation (smoothed absolute value) of the difference D in packet spacing at the receiver compared to the sender for a pair of packets. As shown in the equation (1) below, this is equivalent to the difference in the "relative transit time" for the two packets; the relative transit time is the difference between a packet's RTP timestamp and the receiver's clock at the time of arrival, measured in the same units. If Si is the RTP timestamp from packet i, and Ri is the time of arrival in RTP timestamp units for packet i, then for two packets i and j, D may be expressed as:

$$D(i,j)=(Rj-Ri)-(Sj-Si)=(Rj-Sj)-(Ri-Si) \quad (1)$$

According to aspects of this disclosure, the sender device may terminate the rate reduction (e.g., the sender device may increase the sending rate from the reduced rate to approximately the network link rate) if the inter-arrival jitter becomes zero or smaller than a threshold value. The threshold may be constant or adaptive to changing network conditions. In some examples, the sender device may terminate the rate reduction upon the inter-arrival jitter being maintained at zero or smaller than a threshold value for a minimum period of time. In some instances, the more frequently that rate control unit 66 signals the RTCP SR and RR, the more accurately the sender device may monitor the inter-arrival jitter.

In still another example, a sender device (such as encoder system 12) may monitor the delay (e.g., RTT) and the sender may maintain the sending rate at the reduced rate until the delay is sufficiently reduced. For example, the sender device may maintain sending rate at the reduced rate until the quantity of data stored to the buffer falls below a threshold level.

In other techniques of this disclosure, playout determination unit 64 may examine the received video packets and determine whether the received data is arriving early, in-time, or too late for their scheduled playout. The scheduled playout tinting may be indicated with the encoded data. If the packets are arriving late (e.g., the playout time occurs before the packets are received/examined), rate control unit 66 may request the sender device to decrease the sending bit rate. In some examples, rate control unit 66 may send a TMMBR message with the selected rate.

According to some aspects, rate control unit 66 may estimate n amount of back-logged data (e.g., data buffered at the sender device) by determining the amount of excess delay that needs to be removed and multiplying this excess delay parameter by the data rate of the arriving video as measured by rate control unit 66. In other words, rate control unit 66 may determine a delay based on a difference between at time at which the data is received/examined and the playout time indicated with the data. Rate control unit 66 may then multiply this delay time by the bit rate at which data is being received to determine an amount of data being buffered by the sender.

In some examples, rate control unit 66 may request an initial rate (e.g., in the TMMBR message) that is lower than a sustainable rate of the transport path between video decoder 42 and the sender device (e.g., a useable bandwidth of the network link) to allow the system to decongest the channel. In an example, rate control unit 66 may select an initial rate that is low enough to enable the system to decongest the channel in a fixed amount of time (indicated by the variable T_decongest), if the variable R_sustain is equal to the sustainable rate of the channel, and the variable ΔDelay is equal to the amount of delay that needs to be removed, then rate control unit 66 may initially request the sender device to encode data at bit rate R according to equation (2) below:

$$R = R\_sustain(1 - \Delta Delay/T\_decongest) \quad (2)$$

After sending the message that includes the requested hit rate (e.g., the TMMBR message), rate control unit 66 may wait for the decongestion time (T_decongest) to elapse. Rate control unit 66 may then send another requested bit rate (e.g., an additional TMMBR message) at the rate that is sustainable by the network link (R_sustain), thus ending the decongestion period.

In another example, rate control unit 66 may not send another message (e.g., the additional TMMBR message) to increase the rate. In this example, rate control unit 66 may simply begin measuring an allowable amount of delay (e.g., a delay that is lower than a predetermined threshold). If rate control unit 66 determines that the amount of delay is smaller than required (e.g., the packets are arriving earlier than required for properly scheduled playout), then rate control unit 66 may send another message (e.g., another TMMBR message) to increase/ramp up the sender device encoding rate.

With respect to up-switching, when a channel between a sender device and a receiver device (such as channel 16 between encoder system 12 and decoder system 14 (FIG. 1)) is being under utilized by the sender device it is likely that the delivery of video packets to video decoder 42 will occur before such video packets actually need to be played out (e.g., received before a playout time indicated with the data). In such instances, the sender rate may be increased and some additional delay may be introduced into the system without negatively affecting the user experience.

The excess bits that may be introduced into the transmission path may be computed according to equation (3) below in instances in which the channel bandwidth is equal to the average receiving rate measured at rate control unit 66 (e.g., the worst case with no spare channel bandwidth available):

$$excess\_bits = rate\_increase\_step*(RTT + receiver\_detection\_delay) \quad (3)$$

where excess_bits indicates additional bits being introduced into the system, rate_increase_step indicates an increase in the encoding rate, RTT indicates a round trip time, and receiver_detection_delay indicates a delay associated with detecting delay in the system by the receiver (which may be determined according to any of the techniques described herein).

In some examples, rate control unit 66 may determine the corresponding worst case excess delay (excess_delay) due to the excess bits being introduced (excess_bits) according to equation (4) below:

$$excess\_delay = rate\_increase\_step*(RTT + receiver\_detection\_delay)/avg\_receiving\_rate \quad (4)$$

where excess_delay indicates an amount of delay introduced at the sender device, rate_increase_step indicates an increase in the encoding rate, RTT indicates a round trip time between the sender device and video decoder 42, receiver_detection_delay indicates a delay associated with detecting delay in the system by rate control unit 66, and avg_receiving_rate indicates the rate at which data is being received at video decoder 42.

Hence, in some examples, according to aspects of this disclosure, rate control unit 66 of video decoder 42 may determine a number of excess bits associated with a particular rate increase (e.g. excess_bits) and a delay associated with the introduction of the excess bits (e.g., excess_delay).

Rate control unit 66 may calculate a rate increase amount based on the allowable excess delay parameter. For example, rate control unit 66 may determine how much the sending rate may be increased by the sender device without introducing congestion and/or delay into the system according to equation (5) below:

$$rate\_increase\_step = allowable\_excess\_delay*avg\_receiving\_rate/(RTT + receiver\_detection\_delay) \quad (5)$$

where rate_increase_step indicates an amount by which the sending rate may be increased (which may be referred to as a sender bit rate increase); allowable_excess_delay indicates an allowable excess delay parameter (as described in greater detail below), avg_receiving_rate indicates an average rate at which data has been received prior to determining the rate increase, RTT indicates a round trip time between video decoder 42 and a sender device (such as video encoder 20) and receiver_detection_delay indicates an amount of time required to identify delay at video decoder 42. In some instances, the receiver detection delay parameter may be implementation dependent and may be estimated or measured in offline testing. If such a receiver detection delay is not available, rate control unit 66 may be configured to use an estimated reaction delay, which may be a relatively conservative estimate of the time needed for rate control unit 66 to identify delay.

Because the one-way delay from the sender device to the receiver device that includes video decoder 42 is generally unknown to the receiver device, the receiver device typically may not use this to calculate the allowable excess delay parameter (allowable_excess_delay). Instead, according to aspects of this disclosure, rate control unit 66 may determine an amount of allowable excess delay from the received video packets. For example, rate control unit 66 may determine a time at which video packets are received and/or processed at video decoder 42. Rate control unit 66 may also determine a time at which the video data associated with the video packets are designated to be played out (e.g., displayed to a user). Rate control unit 66 may determine an allowable excess delay parameter based on a difference between the time at which the packets are received and/or evaluated and the playout time).

The allowable excess delay parameter may generally indicate an amount of time that may be utilized by the sender device as a basis for increasing the bit rate without impacting the user experience. For example, the allowable excess delay parameter may indicate an amount of lime that may be used to increase the sending rate without impacting user experience, e.g., without increasing the sending rate to orate that is not supportable by channel 16 such that data arrives too late at video decoder 42 to be decoded and played out at the appropriate time. The allowable excess delay metric may be more accurate from a user-experience perspective, since the allowable excess delay parameter directly indicates whether the video information in received packets may actually be displayed to the user without degradation (e.g., such as jitter, stuttering, or lost frames).

According to aspects of this disclosure, based on the above analysis, rate control unit 66 may impose the following requirements at a receiver device and a sender device to perform up-switching:

The receiver shall examine the arrival of packets and compare this to their regularly scheduled playout times to determine whether there is an acceptable amount of delay that can be introduced into the transmission path: allowable_excess_delay The receiver shall examine the arrival of packets to calculate the average receiving rate: avg_receiving_rate The receiver shall calculate the roundtrip time: RTT The receiver shall calculate the rate_increase_step as follows:
rate_increase_step=allowable_excess_delay*avg_receiving_rate/(RTT+receiver_detection_delay)

When allowed by the Audio Visual Provide with Feedback (AVPF) RTCP transmission rules, the receiver:
should send a Temporary Maximum Media Stream Bit rate Request (TMMBR) when it detects that the rate_increase_step>5%×avg_receiving_rate, and
shall send a TMMBR when it detects that the rate_increase_step>15%×avg_receiving_rate When sending a TMMBR message the requested_rate in the TMMBR:
should be equal to:
avg_receiving_rate+rate_increase_step
shall be:
avg_receiving_rate+0.80(rate_increase_step)
<=requested_rate<=avg_receiving_rate+rate_increase_step In addition, according to aspects of this disclosure, the following requirements may be imposed at the sender device to perform up-switching:
Upon receiving a Temporary Maximum Media Stream Bit Rate Request (TMMBR), the video sender should ramp up its sending rate to the requested_rate within 500 ms and shall ramp it up within 1 second.

It should be understood that the "requirements" noted above are provided for purposes of example, and that the techniques of this disclosure may also be applied using different values than the specific values described above. In addition, while particular techniques are ascribed to particular units of FIG. 3 for purposes of explanation (e.g. such as rate control unit 66), it should be understood that one or more other units of video decoder 42 may be responsible of carrying out such techniques. Moreover, because VT is often a two-way communication flow, similar techniques may be applied on both the forward and reverse network paths, e.g., by both a device designated herein as a sender device (such as a device that incorporates video encoder 20 of FIG. 2) and a device designated herein as a receiver device (such as a device that incorporates video decoder 42 of FIG. 3).

Figure 4A:
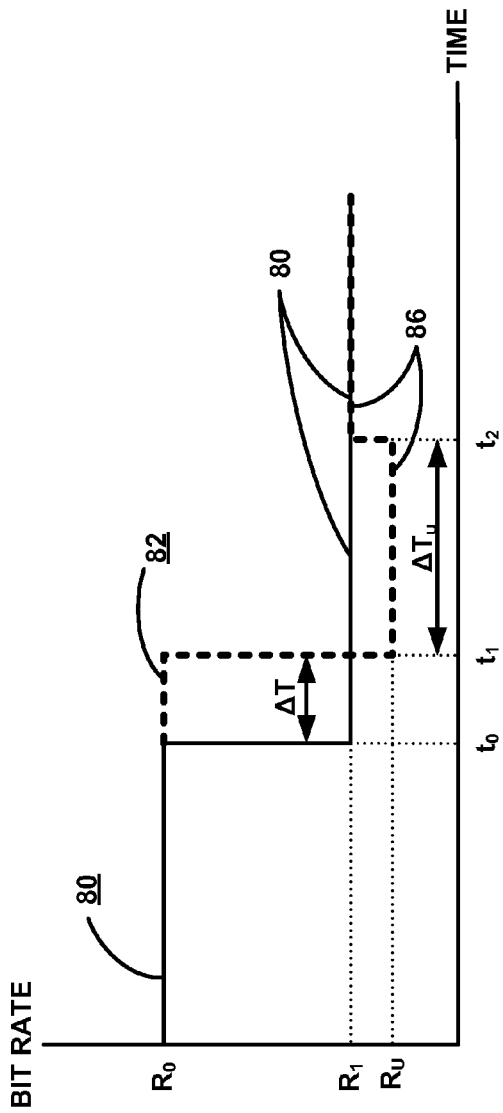
FIGS. 4A and 4B are graphs illustrating video source rate adaptation techniques consistent with the techniques of this disclosure.
Figure 4B:
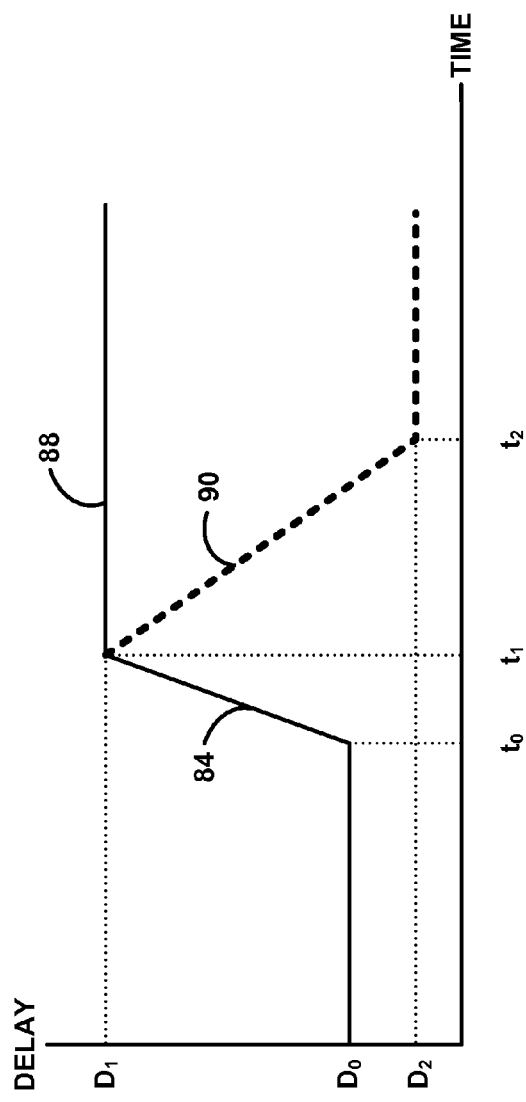

FIG. 4A and FIG. 4B are graphs illustrating video source rate adaptation techniques consistent with this disclosure. For example, FIG. 4A generally illustrates a bit rate of encoded data at a sender device (e.g., such as encoder system 12) during a time that includes a decrease in a network link rate. FIG. 4B generally illustrates the resulting delay that is associated with the decrease in the network link rate. The techniques of FIGS. 4A and 4B are described with respect to encoder system 12, it should be understood that the techniques may be carried out by a variety of other sender devices having a variety of other components.

In the example of FIG. 4A, at time instant $t_0$, a link rate (also referred to as a network link rate or bandwidth) decreases from $R_0$ to $R_1$ as illustrated by line 80, where sending rate link rate). In response to the decline in the network link rate, encoder system 12 may reduce the sending rate. However, as shown in the example of FIG. 4A, there is a response delay ($\Delta T$) from $t_0$ to $t_1$ associated with reducing the sending rate, as illustrated by dashed line 82. The response delay may also be described herein as a buffering duration, during which time the sending rate overshoots the network link rate and encoder system 12 is responsible for buffering the data that cannot be accommodated by the network link.

As illustrated by line 84 in the example of FIG. 4B, delay (e.g., the time between encoded data being available for transmission and the time the encoded data is actually transmitted) increases relatively quickly from $D_0$ to $D_1$ during the response delay ($\Delta T$). That is delay increases relatively quickly from $D_0$ to $D_1$ between the time of the decline in the network link rate $t_0$ and the time of the identification of the decline in the network link rate $t_1$. The delay may be proportional to an amount of data that is buffered at encoder system 12.

At time $t_1$, the examples of FIGS. 4A and 4B illustrate diverging sending rate techniques. For example, solid line 80 illustrates a first example in which encoder system 12 maintains the sending rate at the network link rate. For example, upon identifying the decline in the network link rate, encoder system 12 reduces the sending rate from the original rate $R_0$ to the new, reduced network link rate $R_1$. In this example, the corresponding delay remains relatively high, as illustrated by solid line 88. That is, because the sending rate is out at the network link rate $R_1$, there is no excess bandwidth with which to reduce the amount of data that has been buffered.

Dashed lines 82 and 86 illustrate a second example in which encoder system 12 reduces the sending from the original rate $R_0$ a reduced rate $R_U$ that is less than the network link rate $R_1$. This may be referred to as "undershooting" the network link rate. In this example, encoder system 12 may maintain the reduced rate for a determined recovery rate duration ($\Delta T_u$). During this time, as illustrated by dashed line 90, encoder system 12 reduces the delay from $D_1$ to $D_2$ at time $t_2$.

As described herein, encoder system 12 may determine the reduced rate (RU), the buffering duration ($\Delta T$), and the recovery rate duration ($\Delta T_u$) using a variety of techniques. In one example, encoder system 12 may determine the reduced rate $R_U$ based on the expression $(1-f_U) \times R_1$, where $f_U$ is an undershoot factor and $R_1$ is the reduced link rate, and with $f_U$ determining the rate undershoot factor $(1-f_U)$ and $0<f_L<1$, which relates the sending rate to the link rate $R_1$. In some examples, $f_U$ may be dependent on the magnitude of the network link rate drop, which may be represented by the equation $\Delta R=(R_0-R_1)$. In this example, as shown in FIG. 4A, $R_0$ is the first network link rate prior to being reduced.

If the magnitude of the network link rate decline ΔR is large, $f_U$ may be proportionally large. In other examples, if ΔR is small, then $f_U$ may be proportionally small, as shown in equation (6) below:

$$f_U = \Delta R / R_0 \quad (6)$$

If encoder system 12 buffers all of the bits during the buffering duration (ΔT) and contribute to a delay, encoder system 12 may determine the recovery rate duration ($\Delta T_u$) based on equation (7) below:

$$\Delta T_u = \Delta T(R_0 - R_1)/(f_U R_1) \quad (7)$$

where $\Delta T_u$ is the recovery rate duration, ΔT comprises the buffering duration, $R_0$ comprises the first network link rate, $R_1$ comprises the second, reduced network link rate, and $f_U$ comprises the rate reduction factor.

In some examples, encoder system 12 may apply a minimum bit rate requirement. The minimum bit rate requirement may be based on the capability of video encoder 20, minimum system requirements for user experience, or the like. In examples in which encoder system 12 applies a minimum bit rate requirement, video encoder 20 may apply the minimum bit rate requirement to $R_U$ and, therefore, also to the undershoot factor $f_U$. For example, encoder system 12 may apply equations (8) and (9) below to determine the reduced rate $R_U$ and the undershoot factor $f_U$:

$$R_U >= R_{min} \quad (8)$$

$$f_U <= 1-(R_{min}/R_1) \text{ with } R_1 > R_{min} \quad (9)$$

where $R_U$ is the reduced bit rate, $R_{min}$ is a minimum encoding rate, $R_1$ is the second, reduced network link rate, and $f_U$ is the undershoot factor.

If during the recovery rate duration ($\Delta T_u$) a TMMBR message is received by encoder system 12 that carries a new rate value $R_2$, and $R_2$ is significantly larger than $R_1$ (e.g., $R_2$ is greater than or equal to 1.2 multiplied by $R_1$), then encoder system 12 may shorten the recovery rate duration. Conversely, if $R_2$ is less than $R_1$, then encoder system 12 may determine an additional or extended recovery rate duration.

In general, as noted above with respect to FIGS. 2 and 3, encoder system 12 may estimate the buffering duration (ΔT) from network information, such as RTT, downlink delays (e.g., receiver to sender), knowledge about rate control reaction delay, reaction delay of the congestion control (e.g., estimation of link rate), message generation delays (e.g., delay associated with generating RTCP packets), or the like. This network information may be available at the sender side or may be signaled to encoder system 12 by a receiver device, such as a device that incorporates video decoder 42 (FIG. 3).

While the example of FIGS. 4A and 4B illustrate step-wise changes (e.g., a single rate change between $R_0$ and $R_U$ for purposes of illustration, it should be understood that the techniques may be iteratively applied such that the undershoot profile is more gradual.

Figure 5:
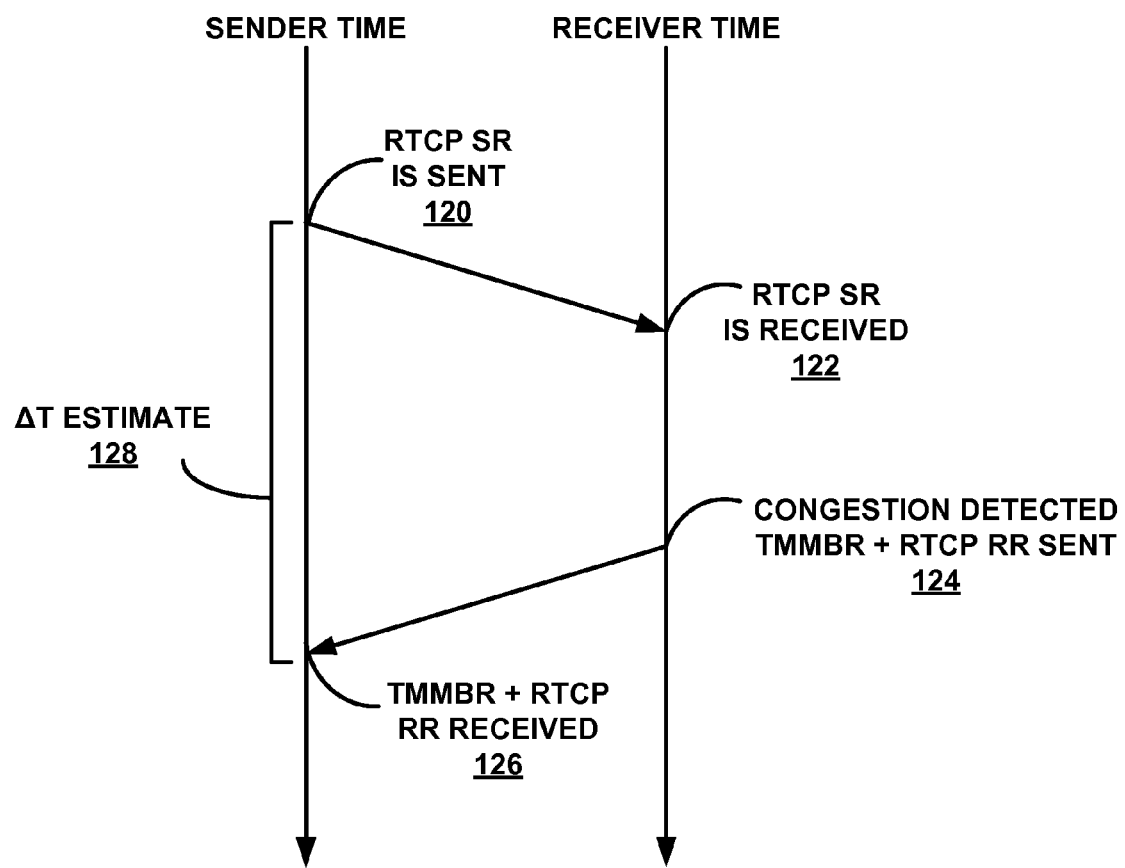
FIG. 5 is a conceptual diagram illustrating determination of a buffering duration consistent with the techniques of this disclosure.

FIG. 5 is a conceptual diagram illustrating determining a buffering duration consistent with the techniques of this disclosure. In the example of FIG. 5, a sender device (e.g., such as encoder system 12) may send an RTCP sender report (SR) to a receiver device (e.g., such as decoder system 14) at time 120. For example, as described in RFC 3550 as noted above, several RTCP packet types may be used to carry a variety of control information. A sender report (SR) may be used for transmission and reception statistics from participants that are active senders. Likewise, a receiver report (RR) may be used for reception statistics from participants that are not active senders and in combination with SR for active senders reporting on more than 31 sources. The receiver device may receive the RTCP SR at time 122.

The receiver device may send an RTCP TMMBR message to a sender device with the estimated maximum bit rate for the forward channel at time 124. In some examples, while there may be delays associated with generating the messages, the receiver device may send a TMMBR message immediately after detecting congestion. While a TMMBR message is described for purposes of illustration, a variety of other messages that may indicate delays/congestion may be used.

To facilitate the sender device with estimating the buffering duration (ΔT), the receiver device may also send the RTCP RR message at time 124. According to aspects of this disclosure, a receiver device may send a RR message immediately after the TMMBR message. In this way, the sender device may receive the TMMBR message and RR message at time 126 and may compute the upper bound for the buffering duration (ΔT) 128 as the time difference between sending the SR that is referred to in the RR by the last SR timestamp (LSR data) included in the RR and the time that the RR is received. In other words, the receiver device may send first data that indicates a request for a bit rate limitation (e.g., the TMMBR message and second data that indicates a time at which a message was generated (e.g., the LSR data). The LSR data may include the middle 32 bits out of a 64 bit network time protocol (NTP) timestamp received as part of the most recent RTCP SR packet from a source. If no SR has been received yet, the LSR timestamp field may be set to zero.

In another example, rather than sending two separate successive messages (e.g., TMMBR and RTCP RR) with the above-noted data, the TMMBR data and RTCP RR data may be grouped into a single RTCP message. At a minimum, the receiver device may send the LSR data, which allows the sender device to estimate the buffering duration (ΔT) 128. In this example, the message size may be reduced.

The receiver device may use the LSR of the last received RTCP SR message, even if the receiver device had previously sent a RTCP RR message that has the same LSR. If the receiver device had not yet sent an RR, the receiver device may combine a full RR message with the TMMBR message. In other examples, to reduce the message size, the receiver device may only send the LSR data together with the TMMBR message, which may be used to compute the RTT.

In another example, if the receiver device has already sent an RR, the sender device may compute the buffering duration (ΔT) 128 more accurately as the time difference between receiving the last received RR message and the new RR message (e.g., that was sent by the receiver after congestion was detected).

In still another example, the sender device may monitor the delay (e.g., the RTT) and the sender device may keep sending data at the reduced rate until the delay is sufficiently reduced. For example, the sender device may maintain the sending rate at the reduced rate $R_u$ until the quantity of data stored to a buffer of the sender device falls below a threshold level.

Figure 6A:
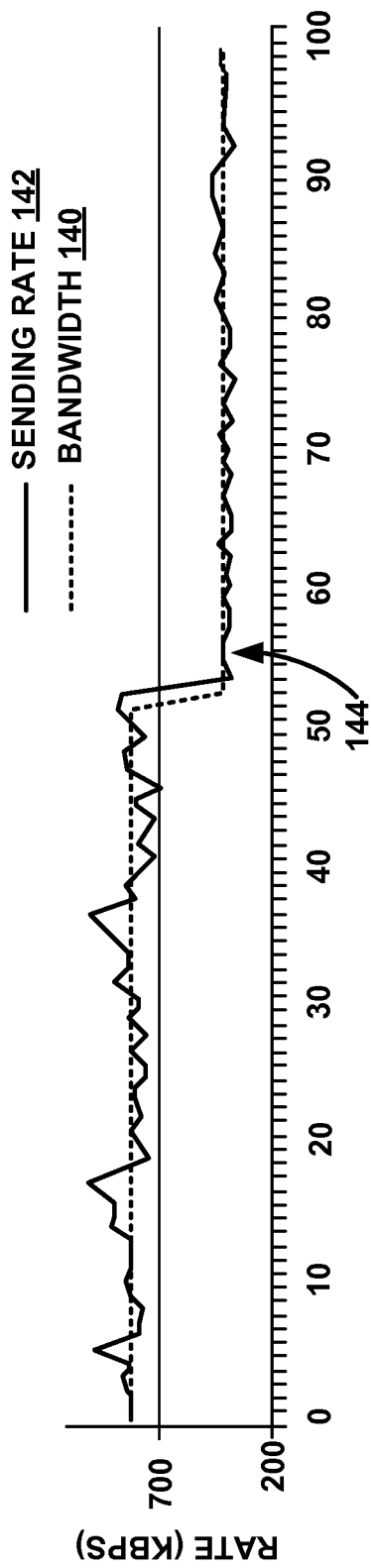
FIGS. 6A and 6B are graphs illustrating a network liter rate decline and a corresponding delay time, respectively.
Figure 6B:
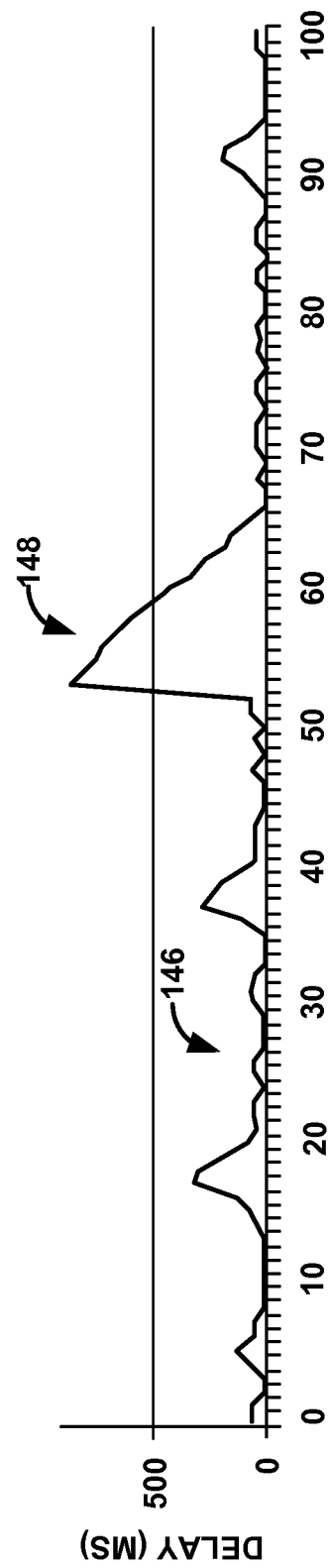

FIGS. 6A and 6B are graphs illustrating a network link rate decline and a corresponding delay time, respectively. The graph of FIG. 6A may be associated with line 80 of FIG. 4A, while the graph of FIG. 6B may be associated with line 88 of FIG. 4B. For example, FIG. 6A, shows a network bandwidth 140 illustrated by the dashed line (also referred to as network link rate) and a sending rate 142 illustrated by a solid line (also referred to as an encoding bit rate) (e.g., measured in kilobytes per second (KBPS)). As illustrated in FIG. 6A, a sender device (e.g., such as encoder system 12) may encode data at sending rate 142 at a rate the same as or similar to bandwidth 140. Accordingly, when bandwidth 140 is reduced at time 144, the sender device may reduce sending rate 142 to approximately the same value as bandwidth 140.

As shown in the corresponding delay graph of FIG. 6B, following the decline in bandwidth 140, the delay at encoder system 12 may be increased from a first level 146 to a second level 148 (e.g., measured in milliseconds (MS)). As described herein, delay rises upon the decline in bandwidth, because there is a reaction time associated with reducing sending rate 142 to the level of bandwidth 140. Encoder system 12 may buffer buffers data that is encoded at the original (higher) rate prior to reducing sending rate 142 to match bandwidth 140. As shown in FIG. 6B, the delay may persist for a relatively long duration if techniques to reduce the delay are not applied.

FIGS. 7A and 7B are graphs illustrating a network link rate decline and a corresponding delay lime, respectively. The graph of Ha 7A may be associated with lines 82 and 86 of FIG. 4A, while the graph of FIG. 7B may be associated with dashed line 90 of FIG. 4B. For example, FIG. 7A shows a network bandwidth 160 illustrated by a dashed line (also referred to as network link rate) and a sending rate 162 illustrated by a solid line (also referred to as an encoding hit rate) (e.g., measured in kilobytes per second (KBPS)). As illustrated in FIG. 7A, a sender device (e.g., such as encoder system 12) may initially encode data at sending rate 162 at a rate the same as or similar to bandwidth 160.

According to aspects of this disclosure, when bandwidth 160 is reduced at time 164, the sender device may reduce sending rate to an reduced rate that is less than bandwidth 160. That is, the sender device may determine a sending rate 162 that undershoots bandwidth 140 in order to reduce the delay associated with the decline in bandwidth 160. As described herein, the sender device may determine a buffering duration, a reduced rate, and/or a recovery rate duration according to the techniques of this disclosure.

As shown in the corresponding delay graph of FIG. 7B, following the decline in bandwidth 160, the delay at encoder system 12 may be increased from a first level 166 to a second level 168 (e.g., measured in milliseconds (MS)). As noted above, delay rises upon the decline in bandwidth, because there is a reaction time associated with reducing sending rate 162 in response to the decline in bandwidth 160. However, by reducing sending rate 162 to a reduced rate (undershooting bandwidth 160), encoder system 12 may reduce the delay more rapidly than the example shown in FIG. 6B.

Figure 8:
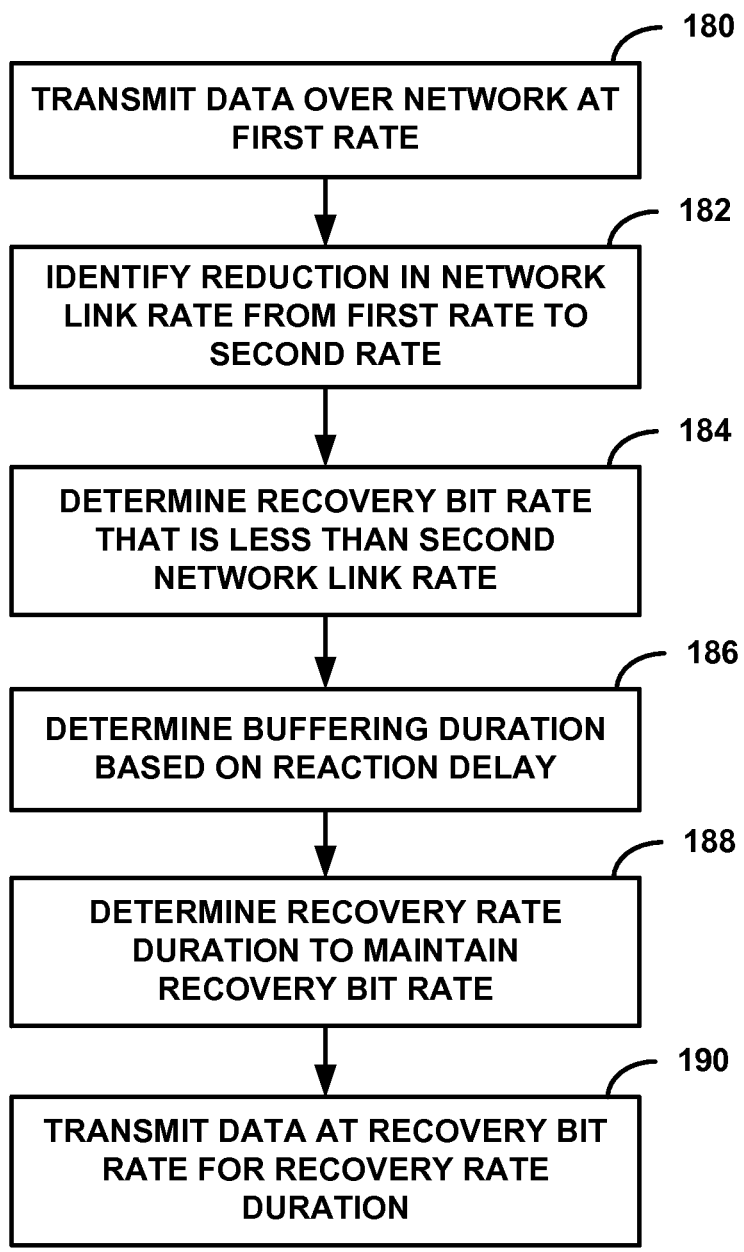
FIG. 8 is a flow diagram illustrating an example process for down-switching a rate at which data is transmitted consistent with the techniques of this disclosure.

FIG. 8 is a flow diagram illustrating an example process for down-switching a rate at which data is transmitted. The example of FIG. 8 is described with respect to encoder system 12 for purposes of illustration. However, it should be understood that the process of FIG. 8 may be carried out by a variety of other devices and/or processors.

Encoder system 12 may encode and transmit data over a network at a first rate (180). While transmitting the data at the first rate, encoder system 12 may identify a reduction in the network link rate from a first rate to a second rate (182). For example, encoder system 12 may monitor network conditions and/or receive one or more messages that indicate a reduction in the network link rate.

Encoder system 12 may determine a recovery bit rate that is less than the second (reduced) network link rate (184). For example, encoder system 12 may determine a bit rate for encoding data that undershoots the new network link rate. According to aspects of this disclosure, encoder system 12 may determine the recovery bit rate based on the difference between the first network link rate and the reduced network link rate. For example, if the reduction in the network link rate is relatively large, encoder system 12 may determine a recovery bit rate that is relatively aggressive (e.g., undershoots the reduced rate by a substantial margin). Likewise, if the reduction in the network link rate is relatively low, encoder system 12 may determine a recovery bit rate that is relatively conservative (e.g., undershoots the reduced rate by a relatively small margin).

Encoder system 12 may also determine a buffering duration based on a reaction delay (e.g., a time associated with reducing the sending rate in response to the reduction in the network link rate) (186). Encoder system 12 may determine the buffering duration in a variety of ways. For example, encoder system 12 may determine the buffering duration by estimating the buffering duration from network information, such as round-hip-time (RTT) between encoder system 12 and a receiver device, downlink delays, a rate adaptation reaction delay, a reaction delay of the congestion control, message generation delays, or the like. Encoder system 12 may determine the network information independently or may receive the network information from the receiver device.

Encoder system 12 may then determine the recovery rate duration to maintain the recovery bit rate (188). In some examples, encoder system 12 may determine the recovery rate duration based on a magnitude of the recovery rate and based on the buffering duration. In some examples, encoder system 12 may determine a buffering duration that is proportional to the magnitude of the reduction of the network link rate (e.g., as indicated by the recovery rate) and the amount of time associated with reacting to the reduction of the network link rate (e.g., as indicated by the buffering duration).

Encoder system 12 may transmit data at the recovery bit rate for the recovery rate duration (190). In some examples, if the network link rate increases during the recovery rate duration, encoder system 12 may terminate the recovery rate duration early and may up-switch to a higher sending rate. It should be understood that depending on the example, certain acts or events of any of the techniques described with respect to FIG. 8 may be performed in a different sequence, may be added, merged, or left out altogether (e.g., not all described acts or events are necessary for the practice of the techniques.

Figure 9:
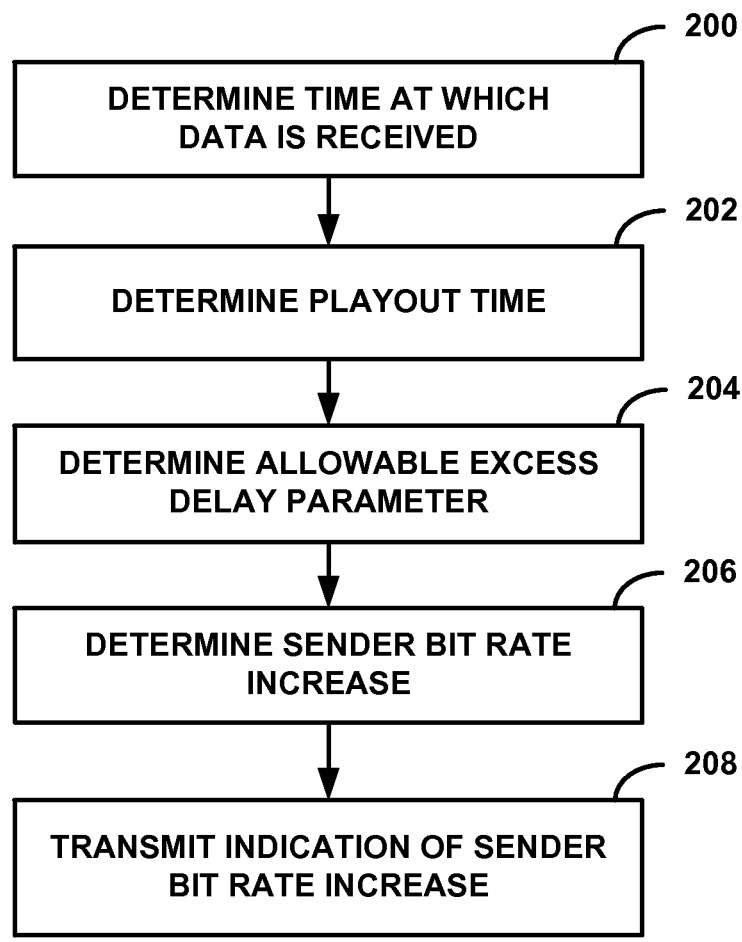
FIG. 9 is a flow diagram illustrating an example process for up-switching a rate at which data is transmitted consistent with the techniques of this disclosure.

FIG. 9 is a flow diagram illustrating an example process for up-switching saturate at which data is transmitted. The example of FIG. 9 is described with respect to decoder system 14 for purposes of illustration. However, it should be understood that the process of FIG. 9 may be carried out by a variety of other devices and/or processors.

Decoder system 14 may determine a time at which data is received (200). For example, in some instances, decoder system 14 may identify the time at which data is received and stored at decoder system 14. In other instances, decoder system 14 may identify the time at which the data is processed (e.g., decoded) by decoder system 14.

Decoder system 14 may also determine a playout time of the received data (202). For example, the received data may include an indication of the time at which the data is intended to be output for display to a user. Accordingly, the indication of the playout time may assist the decoder system 14 in organizing data for output.

Decoder system 14 may determine an allowable excess delay parameter (204). For example, decoder system 14 may determine the allowable excess delay parameter based on a difference between the time at which data is received and the time at which the received data is scheduled to be played out. As described herein, delay may refer to the time between data being available for transmission across a network link and the time the data is actually transmitted to the network at the sender device. Accordingly, the allowable excess delay parameter may indicate an amount of delay that is supportable by the system before user experience is impacted. That is, the allowable excess delay parameter may generally indicate an amount of time that may be utilized by the sender device as a basis for increasing the bit rate without impacting the user experience.

Decoder system 14 may then determine a sender bit rate increase (206). For example, according to aspects of this disclosure, decoder system 14 may determine the sender bit rate increase based on the allowable excess delay parameter. That is, decoder system 14 may determine how much the sending rate may be increased by the sender device without introducing congestion into the system.

In some examples, decoder system 14 may determine a step-wise rate increase to be added to the sending rate. For example, decoder system 14 may determine the sender bit rate increase based on the allowable excess delay parameter and a current average sending rate at which data was received prior to determining the sending rate increase (e.g., a current receiving rate). In this example, decoder system 14 may determine how much the current sending rate may be increased without increasing the rate beyond a sustainable link rate (e.g., a rate at which packets arrive at decoder system 14 after a scheduled playout time of the packets).

In some instances, decoder system 14 may also account for an amount of time required to transmit messages between decoder system 14 and a sender device (e.g., a round trip time) and/or a delay associated with identifying delay at decoder system 14. For example, decoder system 14 may determine the sender bit rate increase based on a ratio of the allowable excess delay parameter multiplied by the receiving rate to a sum of the round trip time and a lime for detecting a delay at decoder system 14.

Decoder system 14 may then transmit an indication of the sending rate increase (208). For example, decoder system 14 may send data that represents a step-wise sending rate increase to the sender device for the sender device to add to the sending rate. In another example, decoder system 14 may send data that represents a requested sending rate that incorporates the sending rate increase to the sender device.

In some examples, decoder system 14 may only transmit the indication of the sender bit rate increase when the sender bit rate increase exceeds a threshold amount. For example, decoder system 14 may compare a sender bit rate increase to a predetermined threshold. In one example, decoder system 14 may only transmit the indication of the sender bit rate increase when the sender bit rate increase exceeds approximately five percent of the receiving rate. In another example, decoder system 14 may only transmit the indication of the sender bit rate increase when the sender bit rate increase exceeds approximately fifteen percent of the receiving rate. Other threshold values or percentages are also possible.

It should be understood that depending on the example, certain acts or events of any of the techniques described with respect to FIG. 9 may be performed in a different sequence, may be added, merged, or left out altogether (e.g., not all described acts or events are necessary for the practice of the techniques).

While certain examples described herein have been described with respect to a particular perspective (e.g., being performed by a "sender device" or a "receiver device") it should be understood that the techniques of this disclosure are not limited in this way. For example, as noted above, VT is often a two-way communication flow. Accordingly, similar techniques may be applied on both the forward and reverse network paths, e.g., by both a "sender device" and a "receiver device." Moreover, while certain devices are shown and described with respect to a certain perspective for purposes of illustration, it should be understood that the devices described herein may have more or fewer components than those shown. As an example, a sender device may incorporate both video encoder 20 (FIG. 2) and video decoder 42 (FIG. 3) and may perform each of the techniques described thereto.

In one Of more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (MD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software units or modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing data, the method comprising:
determining, by a receiver device, an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device;
determining a receiving rate at which data has been received by the receiver device;
determining a round trip time for transmission of data between the receiver device and the sender device;
determining, by the receiver device, a sender bit rate increase for increasing a bit rate at which data is to be sent from the sender device to the receiver device based on the determined allowable excess delay parameter, the receiving rate, and the round trip time; and
transmitting an indication of the sender bit rate increase to the sender device.

2. The method of claim 1, wherein determining the sender bit rate increase comprises determining the sender bit rate increase only when the time at which data is received is earlier than the time at which the received data is scheduled to be played out, such that the allowable excess delay parameter is greater than zero.

3. The method of claim 1, wherein determining the sender bit rate increase based on the allowable excess delay parameter, the receiving rate, and the round trip time comprises determining a sending rate step increase based on a ratio of the allowable excess delay parameter multiplied by the receiving rate to the round trip time.

4. The method of claim 1, further comprising determining the sender bit rate increase based on a time for detecting a delay at the receiver device, such that determining the sender bit rate increase comprises determining the sender bit rate increase based on a ratio of the allowable excess delay parameter multiplied by the receiving rate to a sum of the round trip time and the time for detecting a delay at the receiver device.

5. The method of claim 1, wherein transmitting the indication of the sender bit rate increase comprises transmitting a rate step increase to be added to the sender bit rate.

6. The method of claim 1, wherein transmitting the indication of the sender bit rate increase comprises transmitting a requested sending rate to the sender device, the requested sending rate comprising a combination of the sender bit rate increase and the receiving rate at which data has been received by the receiver device prior to determining the sender bit rate increase.

7. The method of claim 6, wherein transmitting the requested sending rate comprises transmitting the requested sending rate only when the sender bit rate increase exceeds a predetermined threshold.

8. The method of claim 7, wherein the predetermined threshold is greater than approximately five percent of the receiving rate at which data has been received by the receiver device prior to determining the sender bit rate increase.

9. The method of claim 7, wherein the predetermined threshold is greater than approximately 15 percent of the receiving rate at which data has been received by the receiver device prior to determining the sender bit rate increase.

10. The method of claim 6, wherein transmitting the requested sending rate comprises generating a Temporary Maximum Media Stream Bit rate Request (TMMBR) message that includes an indication of the requested sending rate.

11. The method of claim 1, wherein determining the receiving rate comprises determining an average receiving rate, and wherein determining the sender bit rate increase based on the allowable excess delay parameter, the receiving rate, and the round trip time comprises determining a sender rate step increase based on the following equation:

$$\text{rate\_increase\_step} = \frac{\text{excess\_delay\_allowable} * \text{avg\_receiving\_rate}}{(RTT + \text{receiver\_detection\_delay})}$$

wherein rate_increase_step comprises the sending rate step increase, excess_delay_allowable comprises the allowable excess delay parameter, avg_receiving_rate comprises the average receiving rate, RTT comprises the round trip time, and receiver_detection_delay comprises a time for detecting a delay at the receiver device.

12. A receiver device for processing data, the receiver device comprising:
a memory configured to store data; and
one or more processors configured to:
determine an allowable excess delay parameter based on a difference between a time at which the data is received by the receiver device and a time at which the data is scheduled to be played out, wherein the allowable excess delay parameter indicates an amount of delay that is supportable by a channel between a sender device and the receiver device;
determine a receiving rate at which data has been received by the receiver device;
determine a round trip time for transmission of data between the receiver device and the sender device;
determine a sender bit rate increase for increasing a bit rate at which data is to be sent from the sender device to the receiver device based on the determined allowable excess delay parameter, the receiving rate, and the round trip time; and
transmit an indication of the sender bit rate increase to the sender device.

13. The device of claim 12, wherein to determine the sender bit rate increase, the one or more processors are configured to determine the sender bit rate increase only when the time at which data is received is earlier than the time at which the received data is scheduled to be played out, such that the allowable excess delay parameter is greater than zero.

14. The device of claim 12, wherein to determine the sender bit rate increase based on the allowable excess delay parameter, the receiving rate, and the round trip time, the one or more processors are configured to determine a sending rate step increase based on a ratio of the allowable excess delay parameter multiplied by the receiving rate to the round trip time.

15. The device of claim 12, wherein the one or more processors are further configured to determine the sender bit rate increase based on a time for detecting a delay at the receiver device, such that determining the sender bit rate increase comprises determining the sender bit rate increase based on a ratio of the allowable excess delay parameter multiplied by the receiving rate to a sum of the round trip time and the time for detecting a delay at the receiver device.

16. The device of claim 12, wherein to transmit the indication of the sender bit rate increase, the one or more processors are configured to transmit a rate step increase to be added to the sender bit rate.

17. The device of claim 12, wherein to transmit the indication of the sender bit rate increase, the one or more processors are configured to transmit a requested sending rate to the sender device, the requested sending rate comprising a combination of the sender bit rate increase and the receiving rate at which data has been received by the receiver device prior to determining the sender bit rate increase.

18. The device of claim 17, wherein to transmit the requested sending rate, the one or more processors are configured to transmit the requested sending rate only when the sender bit rate increase exceeds a predetermined threshold.

19. The device of claim 18, wherein the predetermined threshold is greater than approximately five percent of the receiving rate at which data has been received by the receiver device prior to determining the sender bit rate increase.

20. The device of claim 18, wherein the predetermined threshold is greater than approximately 15 percent of the receiving rate at which data has been received by the receiver device prior to determining the sender bit rate increase.

21. The device of claim 17, wherein to transmit the requested sending rate, the one or more processors are configured to generate a Temporary Maximum Media Stream Bit rate Request (TMMBR) message that includes an indication of the requested sending rate.

22. The device of claim 12, wherein the device comprises at least one of:
an integrated circuit;
a microprocessor; or
a wireless communication device.

23. The device of claim 12, wherein to determine the receiving rate, the one or more processors are configured to determine an average receiving rate, and wherein to determine the sender bit rate increase based on the allowable excess delay parameter, the receiving rate, and the round trip time, the one or more processors are configured to determine a sender rate step increase based on the following equation:

$$\text{rate\_increase\_step} = \frac{\text{excess\_delay\_allowable} * \text{avg\_receiving\_rate}}{(RTT + \text{receiver\_detection\_delay})}$$

wherein rate_increase_step comprises the sending rate step increase, excess_delay_allowable comprises the allowable excess delay parameter, avg_receiving_rate comprises the average receiving rate, RTT comprises the round trip time, and receiver_detection_delay comprises a time for detecting a delay at the receiver device.

24. An apparatus for processing data, the apparatus comprising:
means for determining an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device;
means for determining a receiving rate at which data has been received by the receiver device;
means for determining a round trip time for transmission of data between the receiver device and the sender device;
means for determining a sender bit rate increase for increasing a bit rate at which data is to be sent from the sender device to the receiver device based on the determined allowable excess delay parameter, the receiving rate, and the round trip time; and
means for transmitting an indication of the sender bit rate increase to the sender device.

25. The apparatus of claim 24, wherein the means for determining the receiving rate comprises means for determining an average receiving rate, and wherein the means for determining the sender bit rate increase based on the allowable excess delay parameter, the receiving rate, and the round trip time comprises means for determining a sender rate step increase based on the following equation:

$$\text{rate\_increase\_step} = \frac{\text{excess\_delay\_allowable} * \text{avg\_receiving\_rate}}{(RTT + \text{receiver\_detection\_delay})}$$

wherein rate_increase_step comprises the sending rate step increase, excess_delay_allowable comprises the allowable excess delay parameter, avg_receiving_rate comprises the average receiving rate, RTT comprises the round trip time, and receiver_detection_delay comprises a time for detecting a delay at the receiver device.

26. A non-transitory computer-readable medium having instructions stored thereon that, when executed, cause one or more processors to:
determine an allowable excess delay parameter based on a difference between a time at which received data is received by the receiver device and a time at which the received data is scheduled to be played out, wherein the allowable excess delay parameter indicates an amount of delay that is supportable by a channel between a sender device and the receiver device;
determine a receiving rate at which data has been received by the receiver device;
determine a round trip time for transmission of data between the receiver device and the sender device;

determine a sender bit rate increase for increasing a bit rate at which data is to be sent from the sender device to the receiver device based on the determined allowable excess delay parameter, the receiving rate, and the round trip time; and transmit an indication of the sender bit rate increase to the sender device.

27. The non-transitory computer readable medium of claim 26, wherein to determine the receiving rate, the instructions cause the one or more processors to determine an average receiving rate, and wherein to determine the sender bit rate increase based on the allowable excess delay parameter, the receiving rate, and the round trip time, the one or more processors are configured to determine a sender rate step increase based on the following equation:

$$\text{rate\_increase\_step} = \frac{\text{excess\_delay\_allowable} * \text{avg\_receiving\_rate}}{(RTT + \text{receiver\_detection\_delay})}$$

wherein rate_increase_step comprises the sending rate step increase, excess_delay_allowable comprises the allowable excess delay parameter, avg_receiving_rate comprises the average receiving rate, RTT comprises the round trip time, and receiver_detection_delay comprises a time for detecting a delay at the receiver device.

\* \* \* \* \*